US009785141B2

(12) United States Patent
Tripathi et al.

(10) Patent No.: US 9,785,141 B2
(45) Date of Patent: Oct. 10, 2017

(54) METHOD, SYSTEM, AND COMPUTER PROGRAM PRODUCT FOR SCHEMATIC DRIVEN, UNIFIED THERMAL AND ELECTROMAGNETIC INTERFERENCE COMPLIANCE ANALYSES FOR ELECTRONIC CIRCUIT DESIGNS

(71) Applicant: Cadence Design Systems, Inc., San Jose, CA (US)

(72) Inventors: Alok Tripathi, Uttar Pradesh (IN); An-yu Kuo, San Jose, CA (US); Bradley Brim, Rainer, WA (US); Taranjit Singh Kukal, Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/476,365

(22) Filed: Sep. 3, 2014

(65) Prior Publication Data
US 2016/0063171 A1 Mar. 3, 2016

(51) Int. Cl.
*G06F 17/50* (2006.01)
*G05B 19/418* (2006.01)

(52) U.S. Cl.
CPC ....... *G05B 19/418* (2013.01); *G06F 17/5063* (2013.01); *G06F 17/5068* (2013.01); *G06F 2217/74* (2013.01); *G06F 2217/80* (2013.01); *G06F 2217/82* (2013.01); *Y02P 90/26* (2015.11); *Y02P 90/265* (2015.11)

(58) Field of Classification Search
CPC . G06F 17/504; G06F 17/5036; G06F 2217/82

USPC .......................................... 716/113, 115, 136
See application file for complete search history.

(56) References Cited

U.S. PATENT DOCUMENTS 6,317,001 B1 * 11/2001 Roth ...................... H03F 1/302
330/256
6,496,962 B1   12/2002 Dalton
7,024,640 B2   4/2006 Buchanan
(Continued)

OTHER PUBLICATIONS

Non-Final Office Action dated Jun. 17, 2008 for U.S. Appl. No. 11/513,061.
(Continued)

*Primary Examiner* — Vuthe Siek
(74) *Attorney, Agent, or Firm* — Vista IP Law Group, LLP

(57) ABSTRACT

Disclosed are methods and systems for by identifying or generating an electrical schematic, generating a thermal schematic by associating thermal RC circuits of the electronic design with the electrical schematic, performing at least two analyses of an electrical analysis, a thermal analysis, and an electromagnetic interference compliance (EMC) analysis with the electrical schematic and the thermal schematic of the electronic design. The electrical, thermal, and EMC analyses may be performed concurrently by forwarding intermediate or final analysis results to each other, and the analysis results may be presented simultaneously in one or more user interface windows. The thermal schematic may be obtained by extracting the thermal RC circuits, identifying corresponding electrical circuit components that correspond to the extracted thermal RC circuits, and importing the thermal RC circuits into the electrical schematic so that the electrical and thermal schematics have the same nodes.

20 Claims, 19 Drawing Sheets

(56) References Cited

U.S. PATENT DOCUMENTS

| | | | |
|---|---|---|---|
| 7,472,363 B1* | 12/2008 | Chandra | G06F 17/5009 |
| | | | 716/106 |
| 7,490,309 B1 | 2/2009 | Kukal et al. | |
| 2003/0212964 A1 | 11/2003 | Rao et al. | |
| 2005/0120319 A1 | 6/2005 | Van Ginneken | |
| 2005/0268268 A1 | 12/2005 | Wang et al. | |
| 2008/0072182 A1* | 3/2008 | He | G06F 17/504 |
| | | | 716/113 |
| 2009/0164183 A1* | 6/2009 | Smith | G06F 17/5018 |
| | | | 703/6 |
| 2011/0320995 A1* | 12/2011 | Osaka | G06F 17/5036 |
| | | | 716/115 |
| 2012/0317529 A1* | 12/2012 | Agarwal | G06F 17/5036 |
| | | | 716/113 |

OTHER PUBLICATIONS

Notice of Allowance dated Dec. 16, 2008 for U.S. Appl. No. 11/513,061.

* cited by examiner

METHOD, SYSTEM, AND COMPUTER PROGRAM PRODUCT FOR SCHEMATIC DRIVEN, UNIFIED THERMAL AND ELECTROMAGNETIC INTERFERENCE COMPLIANCE ANALYSES FOR ELECTRONIC CIRCUIT DESIGNS

CROSS-REFERENCE TO RELATED APPLICATION(S)

This application is related to U.S. Pat. No. 7,490,309 entitled "Method and system for automatically optimizing physical implementation of an electronic circuit responsive to simulation analysis" and filed on Aug. 31, 2006 under U.S. patent application Ser. No. 11/513,061. The content of the aforementioned and U.S. patent is hereby expressly incorporated by reference in its entirety for all purposes.

BACKGROUND

As VLSI technology scales, interconnects are becoming the dominant factor determining system performance and power dissipation. Interconnect reliability due to electro-migration and electromagnetic interference compliance (EMC) are fast becoming serious design issues particularly for long signal lines. In fact, it has been recently shown that interconnect Joule heating in advanced technology nodes can strongly impact the magnitude of the maximum temperature of the global lines despite negligible changes in chip power density which will, in turn, strongly affect the electro-migration lifetime of the interconnect. In analog designs, uni-directional current flow and smaller wire geometries create EM concerns for the signal nets as well. The behavior of analog circuits is even more sensitive to layout induced parasitics and thus electro-migration problems due to the unidirectional current flows in various circuit components. Parasitics not only influence the circuit performance but may often render it non-functional.

In addition to the rising concerns about electro-migration, voltage drop, also called IR drop, represents another class of challenges for modern electronic circuits. Voltage drop represents the voltage reduction that occurs on power supply networks. The IR drop may be static or dynamic and results from the existence of non-ideal elements—the resistance within the power and ground supply wiring and the capacitance between them. While static voltage drop considers only the average currents, dynamic voltage drop considers current waveforms within clock cycles and has an RC transient behavior. Similar effects may be found in ground wiring, usually referred as ground bounce, whereby current flows back to the ground/$V_{SS}$ pins causing its voltage to fluctuate. Both effects contribute to lower operating voltages within devices (e.g., logic cells/gates in digital circuits), which in general increases the overall time response of a device and might cause operational failures due to heat dissipation.

Conventional steady-state or transient thermal analyses use time consuming time-stepping or domain discretization algorithms such as finite element methods or finite difference methods on discretized designs. Moreover, these conventional steady-state or transient thermal analyses are often after-the-fact in that these analyses are usually performed after electronic designs are completed at, for example, the block level, the chip level, the package level, or even the board level at which integrated circuit blocks are integrated with a printed circuit board. The limitations on the sizes of time-step and the amount of computation time as well as intensive computation have rendered transient thermal analyses less than desired. Moreover, conventional EMC analyses are often performed as separate analyses detached from the electronic design stage and the thermal analyses of the electronic designs.

Given the advantages provided by the thermal analyses, EMC analyses, and the electrical analyses, there exists a need for effective and efficient technique to implement schematic driven, unified thermal and electromagnetic interference compliance analyses for electronic circuit designs.

SUMMARY

Disclosed are method(s), system(s), and article(s) of manufacture for schematic driven, unified thermal and electromagnetic interference compliance analyses for electronic circuit designs in one or more embodiments. Some embodiments are directed at a method for schematic driven, unified thermal and electromagnetic interference compliance analyses for electronic circuit designs. The method identify or generate a representation of an electronic design, generate a thermal representation of the electronic design by associating thermal RC circuits of the electronic design with the representation, and perform at least two analyses of an electrical analysis, a thermal analysis, and an electromagnetic interference compliance (EMC) analysis with the representation and the thermal representation of the electronic design in some embodiments described below.

In some of these embodiments, the method may further extract the thermal RC circuits for the electronic design, wherein the representation comprises an electrical schematic of the electronic design, and the thermal representation comprises a thermal schematic including same nodes as the electrical schematic. In addition or in the alternative, the method may further identify the thermal RC circuits of the electronic design, identify corresponding electrical circuit components that correspond to the thermal RC circuits in the representation of the electronic design, and forming the thermal representation by at least importing the thermal RC circuits into the representation according to the corresponding electrical circuit components in the representation in generating the thermal representation.

In some embodiments, the method may perform at least one of associating one or more electrical characteristics and/or one or more physical characteristics with the representation and/or the thermal representation of the electronic design; stitching the one or more electrical characteristics and/or the one or more physical characteristics into the representation and/or the thermal representation of the electronic design; and annotating one or more electrical characteristics and/or one or more physical characteristics onto the representation and/or the thermal representation of the electronic design. Moreover, the thermal analysis may be performed by using at least one general purpose circuit simulator including a SPICE (Simulation Program with Integrated Circuit Emphasis) or SPICE-like simulation engine in some embodiments, instead of or rather than using time-stepping or domain discretization numerical techniques such as various finite element methods and finite difference methods.

In some embodiments, the method may determine steady-state thermal responses of the electronic design by using the results and/or determine transient thermal responses of the electronic design by using the results. Additionally or alternatively, the method may forward thermal analysis results to the electrical analysis or the EMC analysis and perform the electrical analysis or the EMC analysis with at least the thermal analysis results to obtain electrical analysis results or EMC analysis results in some embodiments. In some of the immediately preceding embodiments, the method may further forward the electrical analysis results or the EMC analysis results to the thermal analysis and perform the thermal analysis with at least the electrical analysis results or the EMC analysis results to obtain updated thermal analysis results until a criterion is satisfied.

Moreover, the method may perform an electrical simulation on the representation of the electronic design to obtain one or more electrical characteristics of the electronic design, wherein the one or more electrical characteristics include one or more pin currents and power dissipation of one or more devices in some embodiments. Based at least in part upon the results of at least two of the thermal analysis, the electrical analysis, and the EMC analysis, the method may further modify one or more first characteristics of the thermal representation of the electronic design based at least in part upon the results and automatically modify one or more second characteristics of the representation or a layout portion of the electronic design according to the one or more first characteristics that are modified in some embodiments. In some of the preceding embodiments, the method may further modify the one or more second characteristics of the representation or the layout portion of the electronic design based at least in part upon the results and automatically modify the one or more first characteristics of the thermal representation of the electronic design according to the one or more second characteristics that are modified.

In at least some of these embodiments, the one or more first characteristics may include at least a size of a circuit component design, and the one or more second characteristics include at least a thermal resistance of the circuit component design. In some of the above embodiments, the electronic design may be at a pre-layout stage having no placement or routing design information. In some other embodiments, the electronic design may be at a post-layout stage and include partial or complete placement design data or even partial or complete routing design data. The method may also optionally perform at least one of identifying electrical characteristics from the representation of the electronic design and forwarding the electrical characteristics to the thermal representation of the electronic design for the thermal analysis; sub-dividing a circuit component design into multiple sub-component designs and performing the at least two analyses with the multiple sub-component designs; and identifying one or more EMC critical components in the electronic design based at least in part upon the results.

Some embodiments are directed at a hardware module or system that may be invoked to perform any of the methods, processes, or sub-processes disclosed herein. The hardware system may include one or more variants of general purpose electronic circuit simulators include SPICE (Simulation Program with Integrated Circuit Emphasis) or SPICE-like simulation engines, integration modules, model order reduction modules, various transforms, various matrix decomposition modules, various matrix factorization modules, or one or more numerical modules, etc. in some embodiments. Each of these hardware modules may function by itself or in conjunction with other parts (e.g., the computer buses, communication channels or ports, non-transitory memory, processor(s) or processor core(s), etc.) of a computing system. The hardware system may further include one or more forms of non-transitory machine-readable storage media or devices to temporarily or persistently store various types of data or information such as the firmware. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing thermal circuit extraction for transient thermal analyses are described below with reference to FIGS. 1-14.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a methods, systems, and articles of manufacture for method or system for schematic driven, unified thermal and electromagnetic interference compliance analyses for electronic circuit designs. Other objects, features, and advantages of the invention are described in the detailed description, figures, and claims.

Various embodiments will now be described in detail with reference to the drawings, which are provided as illustrative examples of the invention so as to enable those skilled in the art to practice various embodiments described herein. Notably, the figures and the examples below are not meant to limit the scope of the present invention. Where certain elements may be partially or fully implemented using known components (or methods or processes), only those portions of such known components (or methods or processes) that are necessary for an understanding of various embodiments will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for method or system for schematic driven, unified thermal and electromagnetic interference compliance analyses for electronic circuit designs in one or more embodiments.

Figure 1:
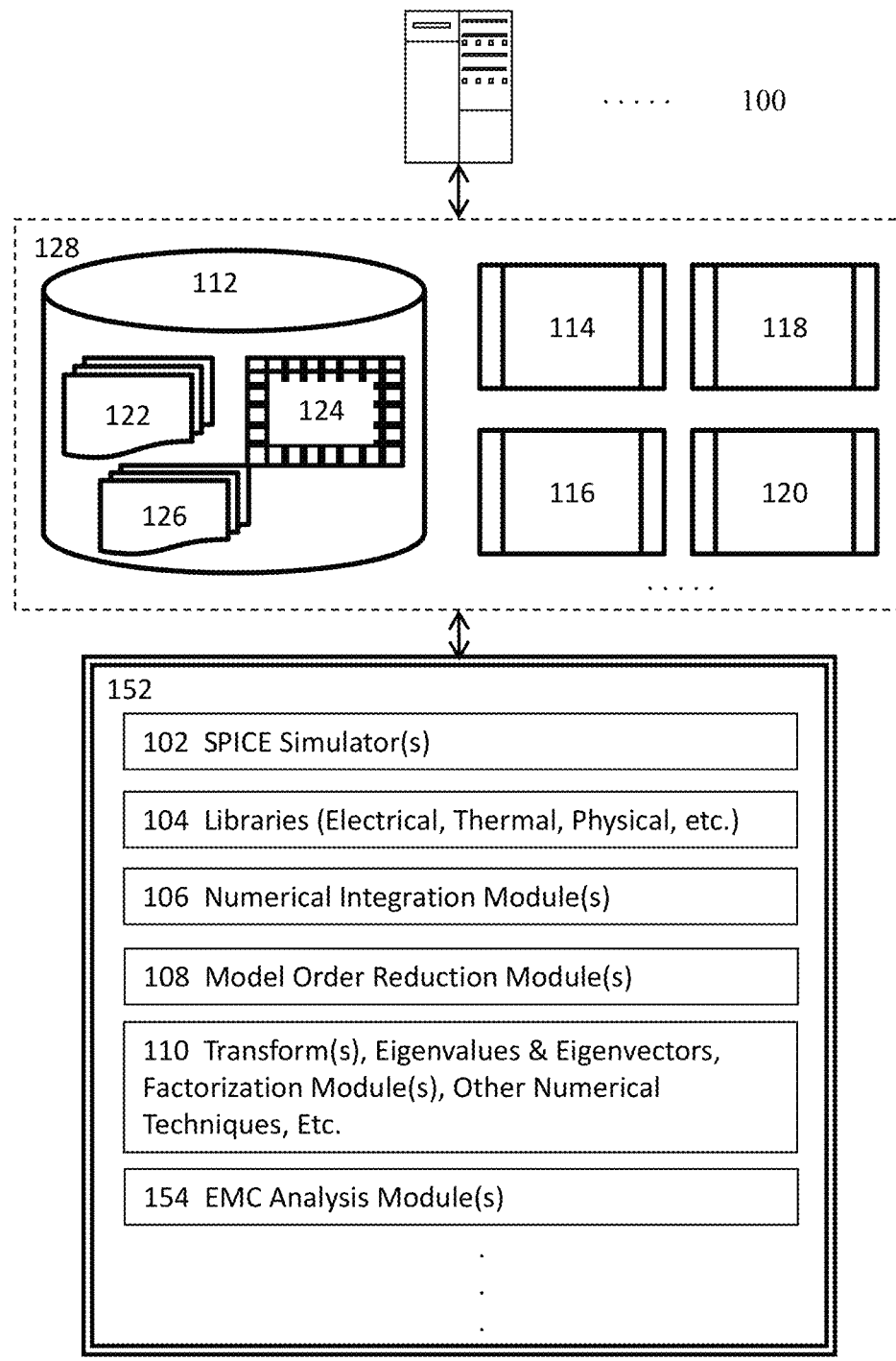
FIG. 1 illustrate a illustrative high level schematic block diagrams for a system for schematic driven, unified thermal and electromagnetic interference compliance analyses for electronic circuit designs in some embodiments.

FIG. 1 illustrate a illustrative high level schematic block diagrams for a implementing thermal circuit extraction for transient thermal analyses in some embodiments. In one or more embodiments, the system for FIG. 1 illustrate a illustrative high level schematic block diagrams for implementing thermal circuit extraction for transient thermal analyses may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), various data, rule decks, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises one or more simulators 102 (e.g., one or more variants of SPICE—Simulation Program with Integrated Circuit Emphasis—simulators) to perform divide-and-conquer simulations, one or more library modules 104 including numerical subroutines, electrical, physical, and/thermal properties, etc. to support the one or more simulators or one or more other numerical computation modules, one or more numerical modules 106 (e.g., a numerical module for performing convolution, a numerical module for performing numerical integration, a numerical module for performing matrix decomposition, etc.) to perform various numerical tasks, one or more model order reduction modules 108 (e.g., a Lanczos module for performing Lanczos algorithm, an Arnoldi's algorithm for performing the Arnoldi's algorithm, the Householder module for performing the Householder algorithm, an iterative numerical algorithm for determining eigenvalues and eigenvectors of a matrix, etc.), one or more transforms or other numerical computation modules 110, or one or more EMC analysis modules, etc.

Figure 2A:
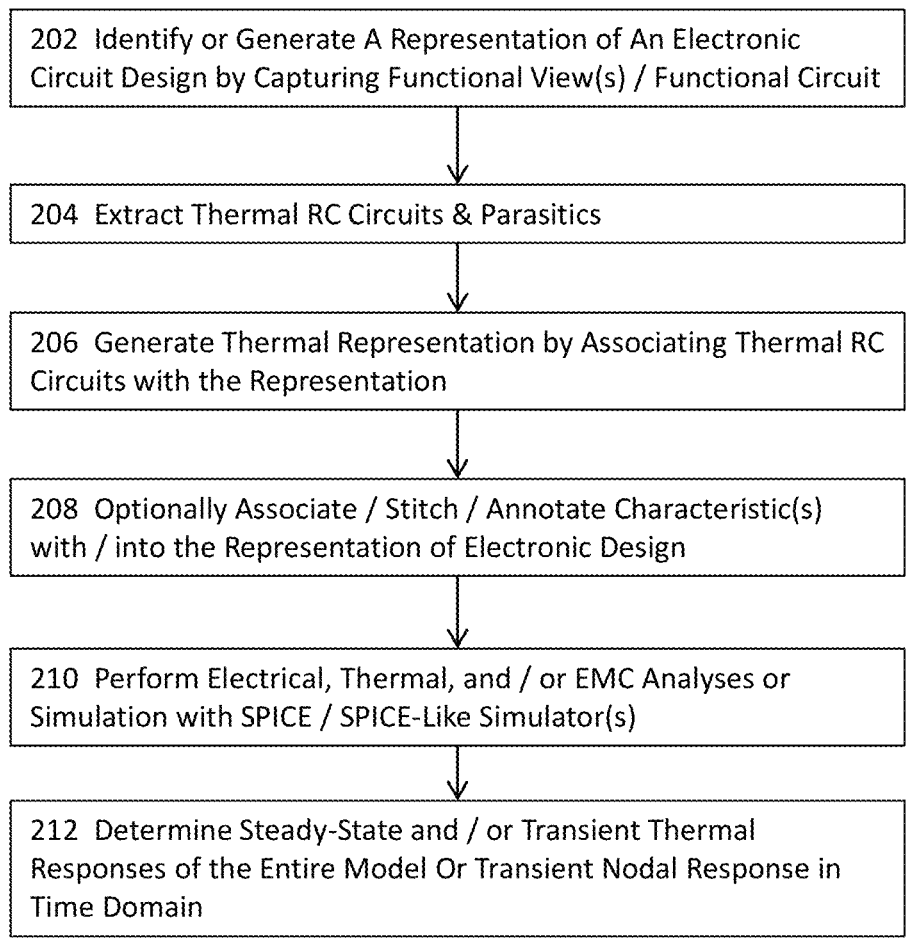
FIG. 2A illustrates a high-level block diagram of a method or system for schematic driven, unified thermal and electromagnetic interference compliance analyses for electronic circuit designs in some embodiments.

FIG. 2A illustrates a high-level block diagram of a method or system for schematic driven, unified thermal and electromagnetic interference compliance analyses for electronic circuit designs in some embodiments. In these embodiments illustrated in FIG. 2A, the method or system may identify (if existing) or generate (if non-existing) a representation of an electronic circuit design by capturing a function view of the electronic circuit at 202. In some of these embodiments, the representation of the electronic circuit design includes an electrical schematic design of the functional view which may further includes the functional description of the electronic circuit design or a portion thereof. The electronic circuit may include an integrated circuit (IC) design, an IC packaging design including an IC design, a PCB (printed circuit board) design including one or more IC packaging designs, and a test bench design including the PCB design.

At 204, the thermal RC circuits of the electronic circuit design may be extracted for the electronic circuit design. In some of these illustrated embodiments, electrical parasitics and/or physical characteristics of one or more components may also be extracted or determined at 204, if a physical representation (e.g., a floorplan, a placement layout, etc.) of the electronic circuit design is available.

In some embodiments, the method or system may generate a thermal representation of the electronic circuit by stitching the thermal RC circuit network, associating the thermal RC circuit network with, importing the thermal RC circuit network into the representation, replacing corresponding circuit components in the representation with the thermal RC circuit network, or by annotating the thermal RC circuit network onto the representation of the electronic circuit design at 206. In some of these embodiments, the thermal representation of the electronic circuit design includes a thermal schematic having the same nodes as the electrical schematic of the electronic design. In some embodiments, the association, stitching, importation, replacement, or annotation (hereinafter "association", "associating", or "importing" collectively) of thermal RC circuit network may be achieved by replacing the electrical resistance ($R_E$) values, the electrical capacitance ($C_E$) values, and the current sources in the electrical schematic with the corresponding thermal resistance ($R_{TH}$), the thermal capacitance ($C_{TH}$), and the power or current sources (P) representing power dissipations of devices, respectively.

At 208, the method or system may further optionally associate electrical parasitics and/or physical characteristics that have been optionally extracted or determined at 204 with the representation. In some embodiments where at least some physical design data are available for the electronic circuit design, the electrical parasitics and/or physical characteristics may be extracted or determined from the physical design data. For example, the length of an interconnect may be directly extracted from a layout including the routing information of the interconnect. As another example, the length of an interconnect may also be determined or derived from a placement layout or a floorplan including no routing information by using the Manhattan distance between the source and the destination of the interconnect.

The electrical parasitics may include electrical resistances, capacitances, inductances, etc. of various circuit components in the electronic circuit design in some embodiments. These electrical parasitics may be extracted or determined by using, for example, the physical characteristics of these circuit components in some embodiments. For example, the electrical resistance of an interconnect may be determined by using the length of the interconnect, the width or profile of the interconnect, and the resistivity of the interconnect material, and optionally the temperature of the interconnect. In some other embodiments, the electrical parasitics may be obtained from schematic level simulations (e.g., SPICE simulations) of the functional circuit.

At 210, the method or system may perform thermal, electrical, and/or EMC simulation with the functional or electrical schematic view and the thermal schematic view by using one or more general purpose electronic circuit simulators including, for example, one or more SPICE (Simulation Program with Integrated Circuit Emphasis) or SPICE-like simulators, without using any time-stepping or discretization-based numerical techniques such as finite element or finite difference methods in some embodiments. The thermal, EMC, and electrical analyses or simulations may be performed concurrently, in batch mode, or sequentially in some embodiments. The simulations of the electrical or functional view and the thermal schematic view may be performed in parallel or iteratively or sequentially while feeding simulation results to each other in either approach. In these embodiments, the method or system cross simulates the electrical or functional view and the thermal schematic view and transmits simulation results between the electrical domain and the thermal domain to analyze the electronic circuit design in light of design requirements of both the electrical or functional domain and the thermal domain.

At 212, the method or system may determine the steady-state and/or transient thermal responses of the entire model or transient nodal responses of the thermal schematic view as well as electrical responses of the electrical or function view. The electrical view, the thermal schematic view, or both the electrical view and the thermal schematic view may be iteratively modified based at least in part upon the simulation results until a convergence criterion or a stopping criterion is reached.

Figure 2B:
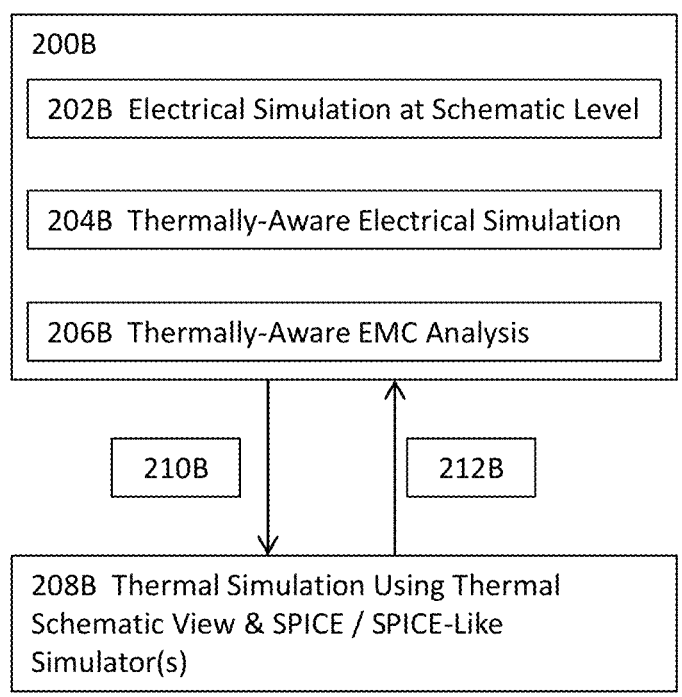
FIG. 2B illustrates a schematic flow diagram for data flows between analysis modules for schematic driven, unified thermal and electromagnetic interference compliance analyses for electronic circuit designs in some embodiments.

FIG. 2B illustrates a schematic flow diagram for data flows between analysis modules for schematic driven, unified thermal and electromagnetic interference compliance analyses for electronic circuit designs in some embodiments. More specifically, FIG. 2B illustrates the electrical simulation or analysis modules 202B including, for example, the thermally-aware electrical simulation module 204B and the thermally-aware electromagnetic interference compliance (EMC) analysis module 206B. The simulation or analysis modules 202B transmit electrical simulation results (e.g., information or data about currents, voltages, etc.) to the thermal simulation module 208B using thermal schematic view and one or more general purpose circuit simulators such as one or more SPICE simulators or SPICE-like simulators.

The thermal simulation module 208B receives the thermal netlist or the thermal schematic view associated with thermal RC circuit network as input and outputs steady-state and/or transient thermal responses of the entire model (e.g., the model for the entire thermal schematic view) or the nodal thermal responses at various nodes in the thermal schematic view. The thermal simulation module 208B receives the electrical simulation results from the electrical simulation or analysis module 202B and use, for example, power dissipation for current sources and/or pin currents or interconnect segment currents (currents flowing through interconnect segments) as heat sources in the thermal schematic view. In some embodiments, an interconnect may be modeled as an equivalent resistor for Joule heating by using the current (I) flowing through as well as the resistance (R) of the interconnect to represent the interconnect as a Joule heating source having the power of $I^2R$.

In some of these embodiments, the interconnect may further be segmented into multiple segments (e.g., n segments, where n is a positive integer greater than 1) and modeled as n-Joule heating sources, each having the power of $I^2R/n$. In addition, depending on whether the physical design data (e.g., placement data or routing data) are available, the resistance of an interconnect segment may be modeled by extracting the length from the physical design data or by deriving the length from Manhattan distance between the source and destination of the interconnect segment as described above. The Thermal simulation module may also transmit thermal simulation results to the electrical simulation or analysis module 202B which then leverage the thermal simulation results to fine tune the electrical or function view of the electronic circuit design. For example, the temperature responses from 208B may be transmitted to 202B so that the temperature-dependent electrical resistances of circuit components may be adjusted using the temperature responses.

Figure 2C:
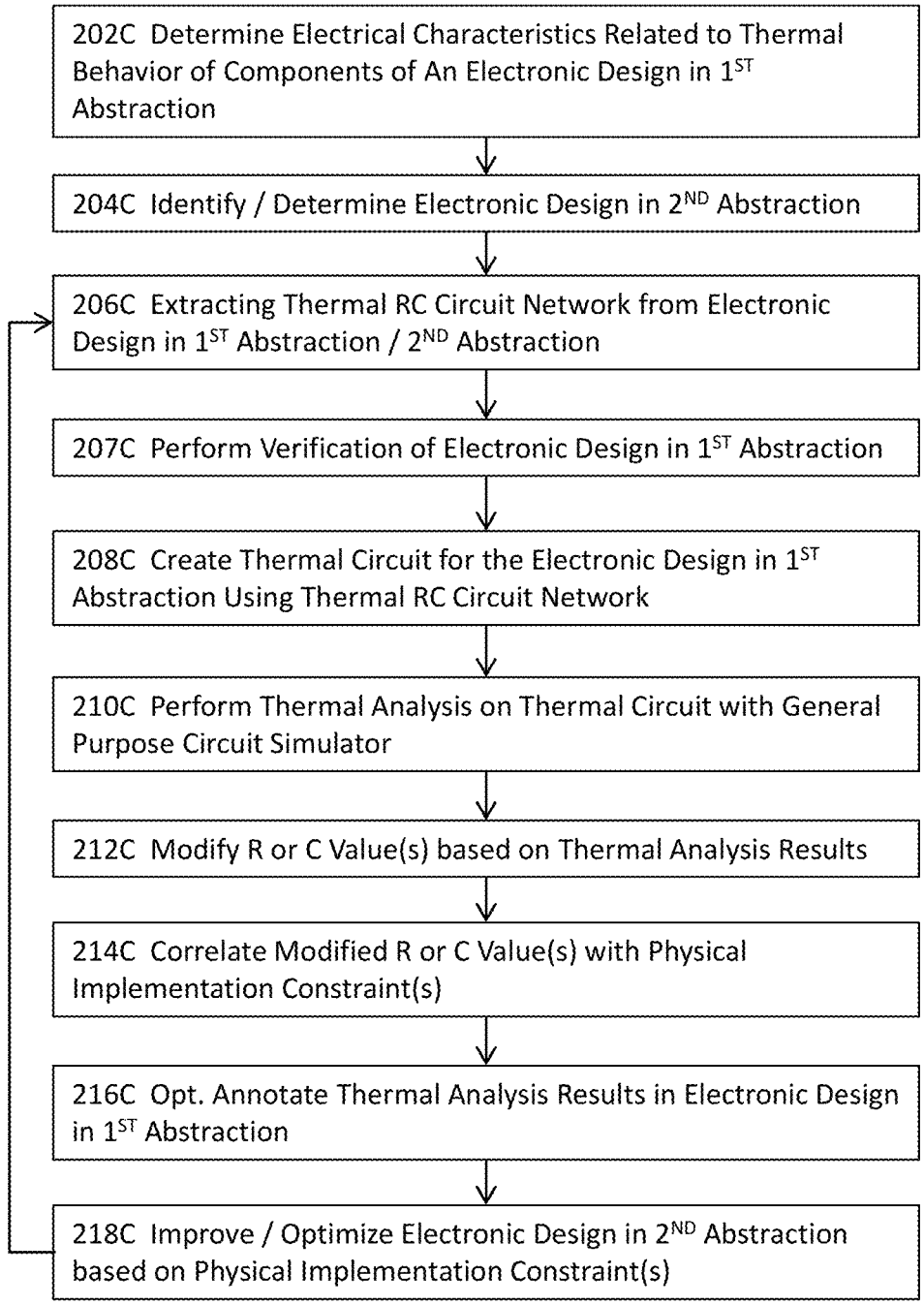
FIG. 2C illustrates a more detailed block diagram for method or system for schematic driven, unified thermal and electromagnetic interference compliance analyses for electronic circuit designs in some embodiments.

FIG. 2C illustrates a more detailed block diagram for method or system for schematic driven, unified thermal and electromagnetic interference compliance analyses for electronic circuit designs in some embodiments. In these embodiments, the method or system may determine one or more electrical characteristics related to thermal behavior of one or more circuit components of an electronic design in the first abstraction 202C. In some of these embodiments, the electronic design in the first abstraction comprises a schematic design including various schematic or standard circuit component symbols and wire connections among these circuit component symbols without representing the physical arrangement or dimensions of these circuit component symbols or wire connections.

The one or more electrical characteristics may include, for example, power dissipation of a circuit component, pin currents, or currents flowing through interconnect segments, etc. In some of these embodiments, the one or more electrical characteristics may be determined from functional or schematic simulations such as simulations using SPICE or SPICE-like simulators. In some embodiments where the electronic design includes analog devices, the functional or schematic simulations may be carried out via SPICE or SPICE-like simulators. In some embodiments where the electronic design includes mixed-signal circuitry and/or digital circuitry, the method or system may replace digital blocks of circuitry by respective input/output (I/O) models at the respective I/O pins by using, for example, input/output buffer information specification (IBIS) models.

Figure 2D:
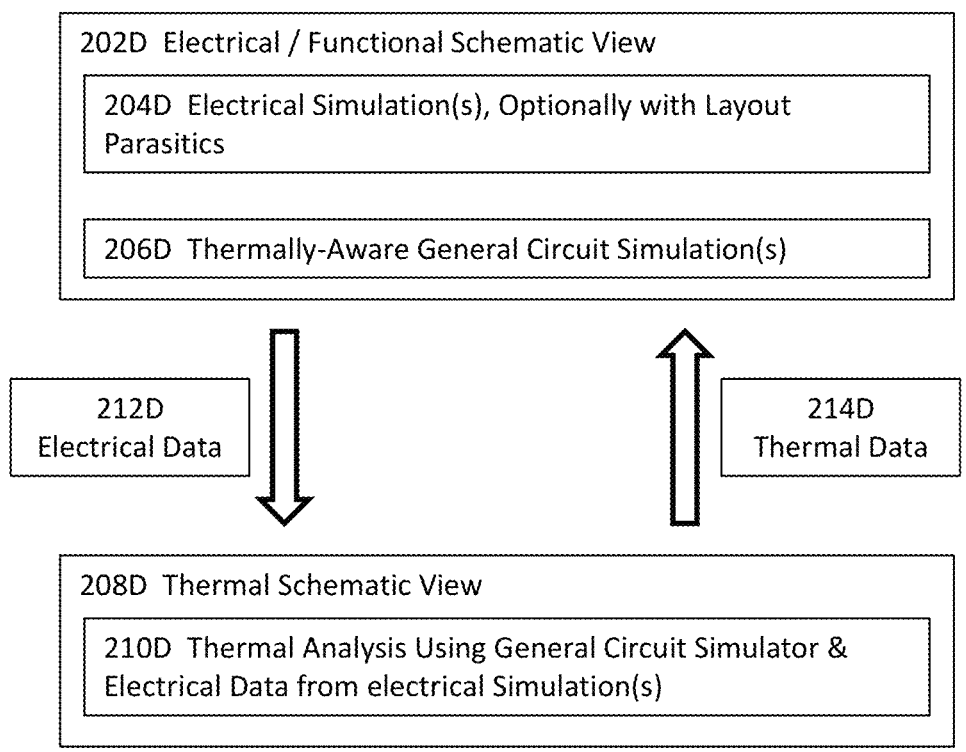
FIG. 2D shows some illustrative exchange of data for concurrent cross domain analyses in some embodiments.

FIG. 2D shows some illustrative exchange of data for concurrent cross domain analyses in some embodiments. In some of these embodiments, FIG. 2D shows some illustrative exchange of data for concurrent electrical, electromagnetic interference compliance, and thermal analyses. More specifically, the method or system described herein may perform one or more electrical simulations at 204D with the electrical or functional schematic view 202D to generate electrical data 212D. The electrical data may include initial electrical data including one or more initial conditions, boundary conditions, etc. in some embodiments.

In some other embodiments, the electrical data may include, for example, power dissipation of one or more devices, currents flowing through one or more pins, pads, terminals, etc., currents flowing through one or more interconnect segments, etc. at one or more intermediate stages of the electrical simulations 204D. In yet some other embodiments, the electrical data generated may include, for example, the final convergent results of power dissipation of one or more devices, currents flowing through one or more pins, pads, terminals, etc., currents flowing through one or more interconnect segments, etc. once the electrical simulations 204D conclude.

In some embodiments, the electrical data may be further optionally annotated, stitched, or associated with electrical parasitics from the layout of the corresponding electronic design of interest. In other words, the electrical data 212D may be passed to the thermal analysis module performing thermal analyses 210D on the thermal schematic view 208D at any stage during or after the electrical simulation 204D. The thermal analysis module may perform one or more thermal analyses at 210D on a thermal schematic view 208D with or without the electrical data by using a general purpose circuit simulator such as a SPICE or SPICE-like simulator to general thermal data 214D, without using any time-stepping or discretization based simulations such as the finite-element techniques or finite-difference techniques.

Upon or shortly after receiving electrical data 212D, the thermal analysis module may perform the one or more thermal analyses with the electrical data 212D to generate the thermal data 214D in light of the electrical data 212D. The initial, intermediate, or finally convergent thermal data 214D may also be forwarded to the electrical simulator to perform one or more thermally-aware general circuit simulations 206D. In these embodiments illustrated in FIG. 2D, the electrical or functional simulations are thus thermally-aware; and the thermal simulations are thus electrically aware. In addition, the electrical simulations, the thermal simulations, and the EMC analyses may be performed concurrently or sequentially in these illustrated embodiments.

At 204C, a representation of the electronic design in the second abstraction may be identified. The representation of an electronic design in the second abstraction may include, for example, a floorplan, a full or partial placement layout, or a full or partial routed design. At 206C, the method or system may extract the thermal RC circuit network for the electronic design in the first abstraction or in the second abstraction.

The thermal circuit view or representation may include, for example, a thermal schematic view of the electronic circuit. In addition, the thermal circuit view or representation may be created by determining the thermal resistance ($R_{TH}$), the thermal capacitance ($C_{TH}$), and the power or current sources (P) representing power dissipations of devices from thermal RC circuit network extraction. In some of these embodiments, the method or system may first identify or determine a thermal response model in the frequency domain in response to a step function input. The time constant or the lumped thermal resistance and the lumped thermal capacitance for the thermal response model from, for example, the results of electrical-thermal co-simulation. The thermal response of the thermal response model may be identified or determined, and the nodal thermal response of one or more nodes of interest may be determined with the thermal response. The thermal RC circuit may thus be generated for a node of interest using the time constant or the thermal resistance and thermal capacitance.

At 210C, steady-state and/or transient thermal analyses may be performed with the thermal circuit view or representation with one or more general purpose circuit simulators including, for example, one or more SPICE or SPICE-like simulators. In some embodiments, the steady-state and/or transient thermal analyses are performed without using any time-stepping numerical techniques such as finite element or finite difference methods in some embodiments.

At 212C, the method or system may modify one or more thermal resistance value, one or more thermal capacitance values, or any combinations thereof based at least in part upon the results of the steady-state and/or transient thermal analyses. In some of these illustrated embodiments, the method or system may identify one or more critical components including those components whose thermal characteristics (e.g., thermal capacitances, thermal resistances, etc.) are above certain threshold percentage values (e.g., greater than or equal to ninety percent) of permissible values. In these embodiments, the method or system may adjust the thermal characteristics of these one or more critical components to bring the thermal characteristics into a desired or required range or level.

For example, if the method or system identifies an interconnect whose Joule heating may have contributed more than a permissible level, the method or system may shorten the interconnect to reduce the heat generation from Joule heating. In some of these embodiments, the method may modify a thermal resistance value of a thermal capacitance value of a critical component at the expense of one or more other components. In the aforementioned example where the length of the interconnect is shortened, the method or system may move the component including the source, the component including the destination, or both components including the source and destination of the interconnect to shorten the length of interconnect, although such a modification may occur at the expense increasing the corresponding lengths of one or more other interconnects connected to these moved component(s).

At 214C, the method or system may correlate the thermal resistance values and/or the thermal capacitances with their corresponding physical implementation constraints. For example, the method or system may correlate the thermal resistance value of an interconnect with the length of the interconnect, given the width or profile of or associated with the interconnect. In these embodiments, the modified thermal resistance or capacitance values may be mapped to or correlated with physical implementation constraints that may be driven or enforced in the physical design or may be annotated onto or associated with the wiring connection in the corresponding electrical schematic design to update the physical design or the corresponding electrical schematic design. At 216C, the method or system may further optionally associate the thermal analysis results (e.g., temperature) with the electronic design in the first abstraction.

For example, the temperature responses may be associated with or annotated onto the schematic design, the floorplan, or the placement layout of the electronic circuit design. In these embodiments, the thermal analysis results may be incorporated when the method or system further extracts or determines the electrical characteristics or parasitics from the electronic circuit design. For example, the method or system may associate temperatures with the placement layout and use the associated temperature to determine the temperature-dependent resistance values of interconnects. At 218C, the method or system may improve or optimize the electronic design in the first or the second abstraction based at least in part upon the physical implementation constraints. In the aforementioned example of reducing the thermal resistance value of an interconnect, the method or system effectively reduces the length of the interconnect by reducing, for example, the thermal resistance associated with the interconnect in the thermal schematic view.

The correlated length of the interconnect may thus be derived from the reduced thermal resistance value. The method or system may thus drive or enforce the correlated length in the electronic design in the first or the second abstraction. For example, the method or system may move a component including the destination of the interconnect closer to the other component including the source of the interconnect in a floorplan or a placement layout such that the Manhattan distance is modified accordingly. As another example, the method or system may annotate the correlated length of the interconnect with the wiring connection in a schematic view of the electronic design. The method or system may iteratively return to 206C to perform another thermal RC circuit network extraction in a substantially similar manner as previously described and the proceed to 207C to perform verification of the electronic design in the first abstraction level with the updated electronic design from 218C.

Figure 3:
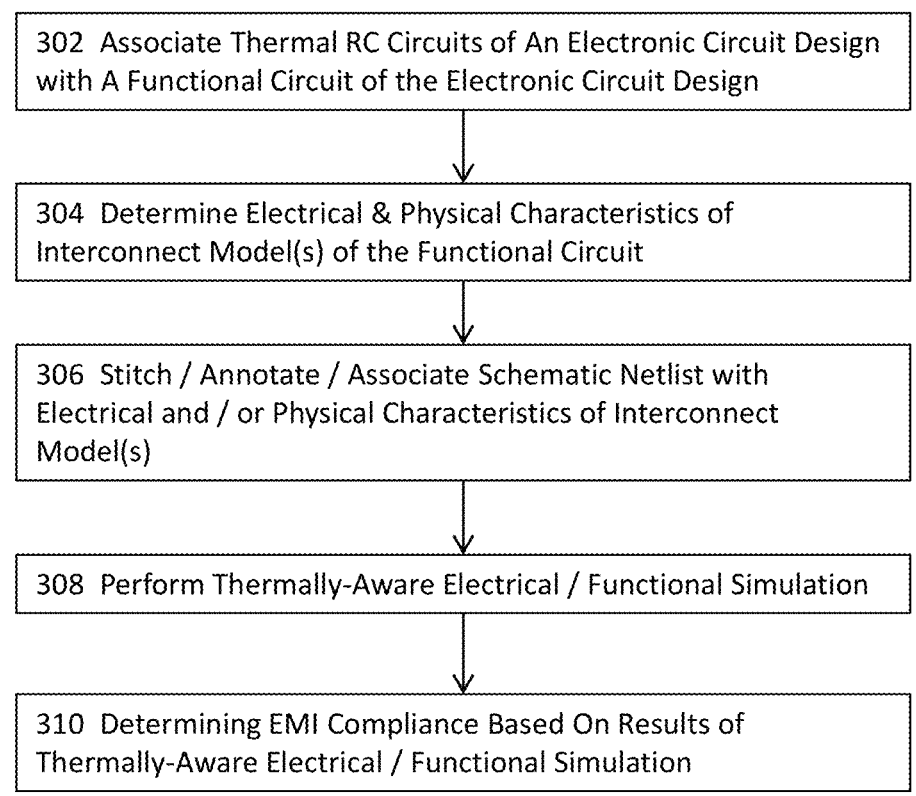
FIG. 3 illustrates a high-level block diagram for a method or system for schematic driven, unified thermal and electromagnetic interference compliance analyses for electronic circuit designs in some embodiments.

FIG. 3 illustrates a high-level block diagram for a method or system for schematic driven, unified thermal and electromagnetic interference compliance analyses for electronic circuit designs in some embodiments. In these embodiments, the method or system may identify an electronic circuit design at 302. In some of these embodiments, the thermal RC circuit network of the electronic circuit design may also be extracted and associated with, for example, a schematic representation of the electronic design to for a thermal schematic view. For example, the method or system may create the thermal schematic view by determining the thermal resistance ($R_{TH}$), the thermal capacitance ($C_{TH}$), and the power or current sources (P) representing power dissipations of devices from thermal RC circuit network extraction in identical or substantially similar manners as those described above for reference numeral 208C.

In these embodiments illustrated in FIG. 3, the techniques and methodologies described do not necessarily require the thermal RC circuit network to enjoy the full functionality and achieve the full effects. In addition, the electronic design may include a schematic design, a floorplan, or a placement design of an IC design, an IC packaging design, or a test bench design. At 304, the method or system may determine one or more electrical and/or physical characteristics for one or more interconnect models in the electronic design. In some of these embodiments, the one or more interconnect models may include one or more parameterized models having at least one parameter for modeling or approximating one or more interconnects.

For example, a parameterized interconnect may include the length parameter, the width or cross-sectional area parameter, and a temperature parameter, each of which receives a parameter value to model or approximate one or more interconnects in the electronic design. At 306, the method or system may associate a schematic list with the one or more electrical and/or physical characteristics for one or more interconnect models. These one or more interconnect models may be used to, for example, model the Joule heating phenomenon of these interconnects represented with these one or more interconnected models in some embodiments.

At 308, the method or system may perform functional or electrical simulation to determine the electrical characteristics (e.g., pin currents, currents flowing through interconnect segments, nodal voltages, power consumption, etc.) In some of these embodiments, the functional or electrical simulation may be performed in conjunction with one or more steady-state or transient thermal analyses to cross simulate both the electrical behavior and the thermal responses of the electronic circuit design. At 310, the method or system may determine the electromagnetic interference compliance (EMC) based at least in part upon the results of the electrical or functional simulation performed at 308. For example, the method or system may determine whether the simulated harmonic content of a circuit component is greater than a predetermined threshold (e.g., a threshold percentage) with respect to a permissible value to determine whether the circuit component raises EMC concerns.

Figure 3A:
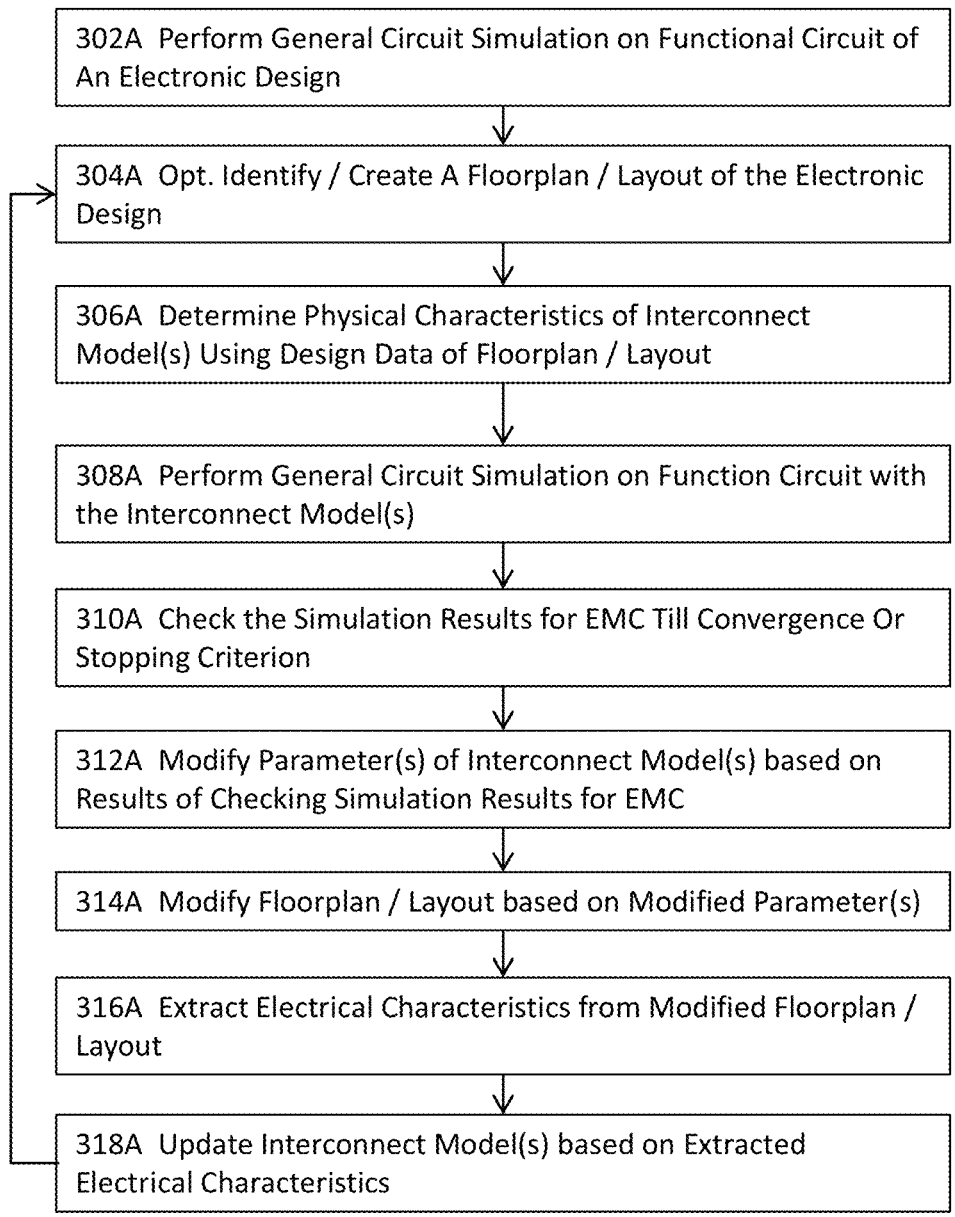
FIG. 3A illustrates a more detailed block diagram for a method or system for schematic driven, unified thermal and electromagnetic interference compliance analyses for electronic circuit designs in some embodiments.

FIG. 3A illustrates a more detailed block diagram for a method or system for schematic driven, unified thermal and electromagnetic interference compliance analyses for electronic circuit designs in some embodiments. In these embodiments illustrated in FIG. 3A, the method or system may perform circuit simulation on a functional circuit of an electronic design. In some of these embodiments illustrated in FIG. 3A, the circuit simulation includes one or more schematic level simulations that determine harmonic content of circuit components by using Fourier transforms of switching current and voltage waveforms. In addition or in the alternative, the electronic design includes an integrated circuit (IC) design, an IC packaging design including an IC design, a PCB (printed circuit board) design including one or more IC packaging designs, and a test bench design including the PCB design in some embodiments.

At 304A, the method or system may optionally identify or create a floorplan, a partial or full placement layout, or a partially or fully routed layout. One or more interconnect models may be identified (if existing) or determined (if not existing) at 306A. In some of these embodiments illustrated in FIG. 3A, the one or more interconnect models may be based at least in part upon the physical design data of the optionally identified or created floorplan, the partial or full placement layout, or the partially or fully routed layout. For example, the method or system may extract the geometric characteristics (e.g., length and width or profile of an interconnect) of the interconnects from a partially or fully routed layout to create the one or more interconnect models. As another example, the method or system may determine the geometric characteristics of an interconnect for an interconnect model by using, for example, the Manhattan distance between the source and the destination of the interconnect and the width associated with the interconnect.

An interconnect model of these one or more interconnect models may include the temperature-dependent characteristics such as electrical resistance in some embodiments. In some embodiments, one or more of these physical or electrical characteristics may be represented in a parameter form awaiting their respective input values to model a particular interconnect. For example, an interconnect model may include a first parameter for the length, a second parameter for the width, and a third parameter for the temperature of the interconnect. Upon receiving the respective length, width, and temperature values, the method or system may use these received values to model a particular interconnect. At 308A, one or more electrical simulations may be performed on the electronic circuit with the one or more interconnect models identified or determined at 306A.

The one or more electrical simulations may be performed on a general purpose circuit simulator such as a SPICE or SPICE-like simulator. The method or system may then check the simulation results for electromagnetic interference compliance (EMC) or other applicable analyses at 310A. In some of these embodiments, the method or system may check the simulation results after a convergence criterion or a stopping criterion (e.g., a threshold number of iterations has been reached, the variations between a successive number of iterations fall within a range or below a threshold value, etc.) Upon identifying one or more EMC issues (e.g., the simulated harmonic content exceeds a threshold percentage such as ninety percent of the permissible value) or violations (e.g., the simulated harmonic content exceeds the permissible value), the method or system may modify one or more values of the corresponding one or more parameters of an interconnect model based at least in part upon the results of checking the simulation for electromagnetic interference compliance at 312A.

For example, the method or system may modify the length value of an interconnect to resolve the EMC issue or violation. The functional circuit design, floorplan, or layout may be modified accordingly at 314A based at least in part upon the one or more modified values of the one or more parameters. For example, the method or system may annotate, stitch or associate the modified value with the schematic design in some embodiments where the electronic design under consideration is the schematic. As another example, the method or system may update the placement layout to reflect the modified length value of the interconnect such that the Manhattan distance between the source and destination of the interconnect corresponds to the modified length value.

As yet another example, the method or system may invoke the routing engine to re-route or modify the interconnect of a partially or fully routed layout to reflect the modified length value of the interconnect. At 316A, the method or system may then extract or determine the electrical characteristics from the modified schematic, floorplan, or layout and update one or more interconnect models based at least in part upon the extracted electrical characteristics at 318A. For example, the method or system may perform one or more simulations on the electrical schematic of the electronic circuit to obtain the updated pin currents, the currents flowing through interconnect segments based on the pin currents, the power dissipation of one or more interconnects, etc. at 316A and update the corresponding interconnect models in the electronic design. With the electronic design including the one or more updated interconnect models, the method or system may return to 306A or optionally return to 304A and repeat the acts described above until an electromagnetic interference compliant electronic design is achieved or until a stopping criterion is met (e.g., simulation results showing critical devices as electromagnetic interference compliant).

Figure 3B:
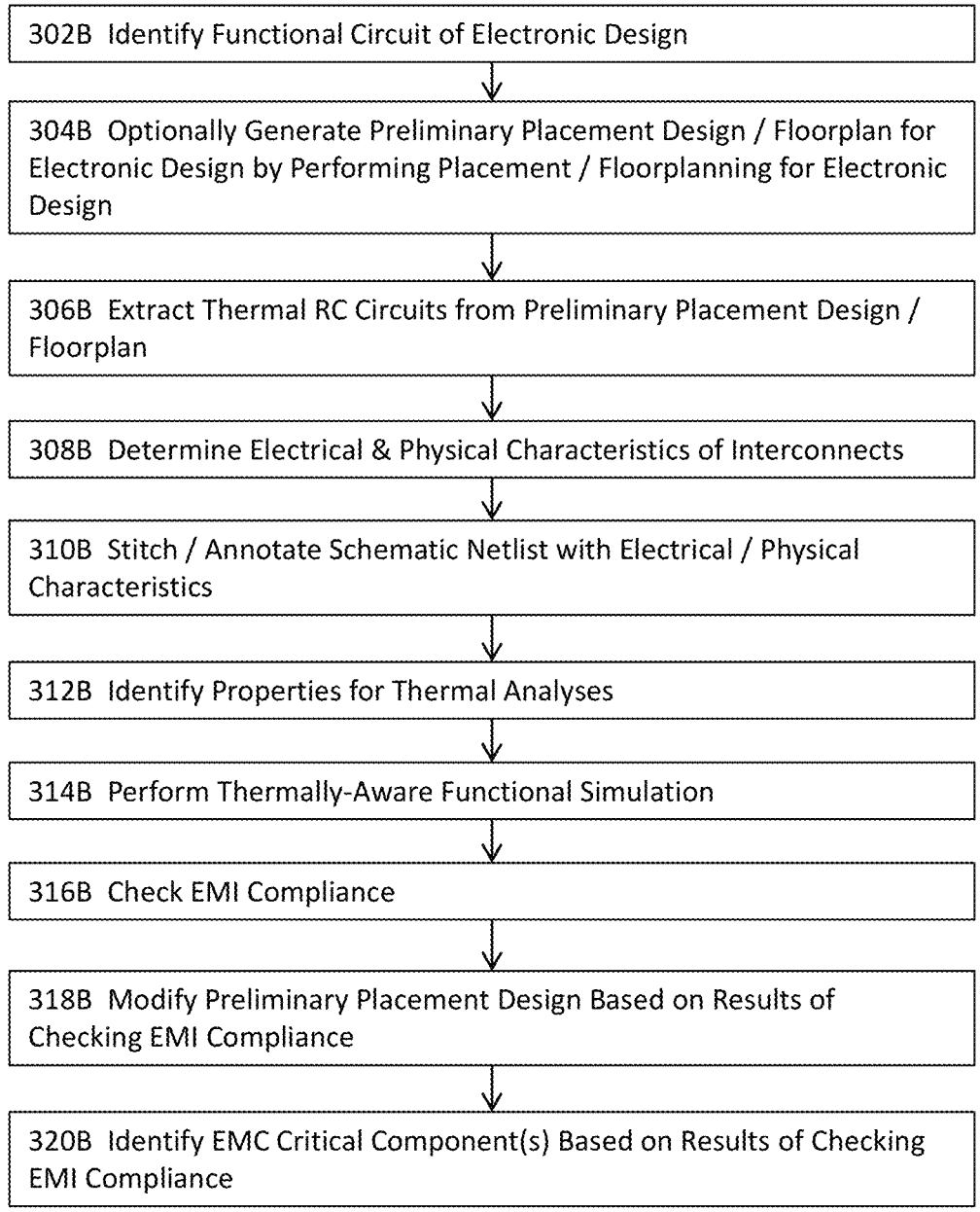
FIG. 3B illustrates another more detailed block diagram for a method or system for schematic driven, unified thermal and electromagnetic interference compliance analyses for electronic circuit designs in some embodiments.

FIG. 3B illustrates another more detailed block diagram for a method or system for schematic driven, unified thermal and electromagnetic interference compliance analyses for electronic circuit designs in some embodiments. More specifically, FIG. 3B illustrates the embodiments of unified electrical analysis, thermal analysis, and EMC analysis for a pre-layout electronic design. In these embodiments illustrated in FIG. 3B, the method or system may identify an electronic design capturing a function circuit at 302B. The electronic design may include any representation of the electronic design in a pre-layout stage that is prior to the completion of the placement process. At 304B, the method or system may optionally generate a floorplan or a preliminary placement design for which the placement is not completed.

The thermal RC circuit network may be extracted at 306B by using various techniques In some embodiments, the method or system may overlay the extracted thermal RC circuit of each device on the corresponding device in the functional or electrical schematic view to form the thermal schematic view. In some embodiments, the method or system may create the thermal schematic view by determining the thermal resistance ($R_{TH}$), the thermal capacitance ($C_{TH}$), and the power or current sources (P) representing power dissipations of devices from thermal RC circuit network extraction to form the thermal schematic view in identical or substantially similar manners as those described for reference numeral 208C.

The method or system may further determine one or more electrical characteristics, one or more physical characteristics, or any combinations thereof for at least one interconnect in the electronic design at 308B. Because the electronic design is at the pre-layout stage and thus includes no routing information, the method or system may determine, for example, the approximate length of an interconnect by using the Manhattan distance between the source and the destination of the interconnect. The method or system may also use the width value for the interconnect to be subsequently added to the electronic design as the approximate width of the interconnect. In addition, the method or system may consult the technology file or library including the thickness of a metal layer to which the interconnect belongs to identify the approximate thickness of the interconnect.

The method or system may further use these approximate physical characteristics together with, for example, the bulk resistivity of the interconnect material to determine the electrical resistance (R) of the interconnect at 308B. In some embodiments where the functional or electrical simulation results have been identified, the method or system may further use the current (I) flowing through the interconnect to determining the Joule heating for the interconnect. This interconnect may then be modeled as a heat source generating $I^2R$ as the amount of Joule heating released or dissipated by the interconnect.

In some embodiments, the method or system may further segment the interconnect into multiple interconnect segments (e.g., n segments, where n is a positive integer greater than one). This interconnect may thus be modeled as "n" different heat sources distributed along the interconnect path, and each of these "n" heat sources generates $I^2R/n$ as the amount of Joule heating released or dissipated by the interconnect segment. In some embodiments, the one or more electrical characteristics may include the inductance (e.g., self-inductance or mutual inductance) associated with the interconnect by using the length value and the electric current information (e.g., the time rate of change of the electric current through the interconnect). In some of these embodiments, an interconnect may be modeled as a parameterized model that receives one or more parameter values (e.g., length, width, thickness, cross-sectional area, temperature, electric current, time rate of change of electric current, etc.) for defining a specific interconnect.

These one or more electrical and/or physical characteristics may be stitched onto, annotated in, or associated with the electronic design at 310B. For example, the method or system may stitch, annotate, or associate the one or more electrical characteristics and/or one or more physical characteristics with a schematic netlist of the electronic design at 310B. At 312B, the method or system may further identify one or more properties (e.g., thermal conductivity of the material, heat transfer coefficient of a medium, etc.), and/or one or more conditions (e.g., one or more boundary conditions, one or more initial conditions, or any combinations thereof, etc.) that may be needed for thermal analyses.

At 314B, the method or system may iterative perform thermally-aware functional or electrical simulation in which the electrical simulation of the functional or schematic circuit and the thermal simulation using the extracted thermal RC circuit network are iteratively performed in each other's context to transmit respective simulation results to each other. For example, the electric current information from electrical simulations may be forwarded to thermal simulations to more correctly capture the thermal effects of Joule heating and power dissipation of devices. As another example, the temperature responses from the thermal simulations may also be forwarded to the electrical simulations to more accurately model the temperature-dependent properties (e.g., electrical resistance) of materials. The thermally-aware functional or electrical simulation and the electrically-aware thermal simulation may be iterative performed until a convergence criterion or a stopping criterion is reached.

At 316B, the method or system may perform the thermally-aware EMC analysis by at least checking the simulation results for electromagnetic interference (EMI) compliance. In the event that an EMC issue or an EMC violation is detected, the method or system may modify the preliminary placement design or the floorplan based at least in part upon the results of the thermally-aware EMC analysis at 318B in substantially similar manners as those described for 314A. The method or system may return to 306B and repeat the aforementioned acts from 306B until an electromagnetic interference compliant electronic design is achieved or until a stopping criterion (a prescribed threshold amount of iteration time, a threshold number of iterations, the total number of EMC issues and/or EMC violations, etc.) is reached. In some of these illustrated embodiments where the floorplan or the partially placed design is modified at 318B, the method or system may further verify the correctness of the electronic design after the modifications at 318B. At 320B, the method or system may identify one or more EMC critical components based at least in part upon the results of the thermally-aware EMC analysis. In some embodiments, the one or more EMC critical components may also be identified as such or may be identified with different identifiers (e.g., different color coding) to indicate the severity of the EMI issue or EMI violation.

Figure 4:
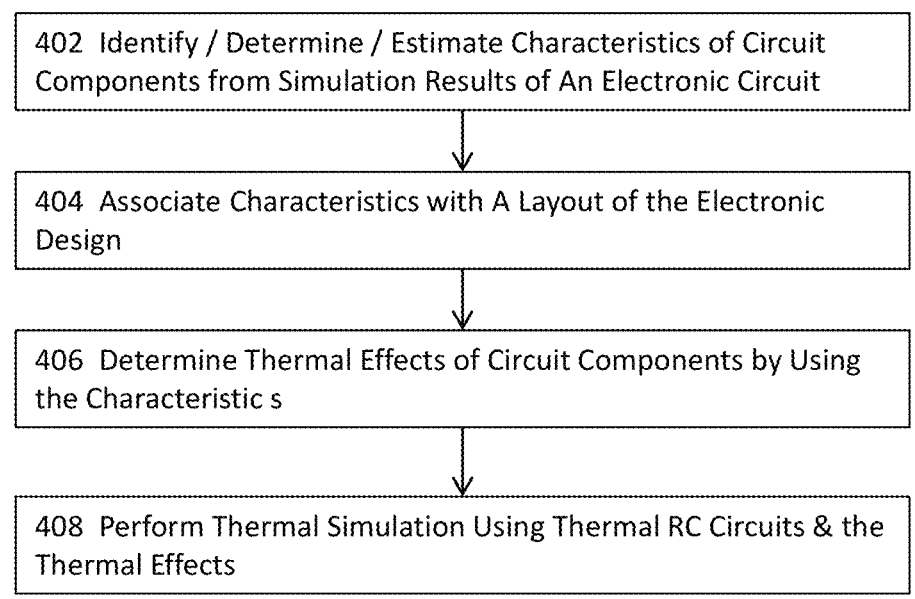
FIG. 4 illustrates a high level block diagram for a process or module for performing schematic driven thermal analyses accounting for device heat dissipation and interconnect Joule heating for electronic circuit designs in some embodiments.

FIG. 4 illustrates a high level block diagram for a process or module for performing schematic driven thermal analyses accounting for device heat dissipation and interconnect Joule heating for electronic circuit designs in some embodiments. In these embodiments illustrated in FIG. 4, the method or system may identify, determine, or estimate one or more characteristics one or more circuit components of an electronic circuit design from functional or electrical simulation results of the electronic circuit design at 402. The one or more characteristics may include, for example, electric current information including average, peak, or transient electric currents at various pins, pads, terminals, or ports (collectively "pin currents"), electric currents flowing through various interconnect segments, power dissipation of one or more devices, etc. from the electrical or functional simulation results.

In some of these embodiments illustrated in FIG. 4, the functional or electrical simulation includes one or more simulations at the input/output (I/O) level using IBIS models on an IBIS simulator to obtain worst case or corner case scenarios. These embodiments remove the need for an HDL (hardware description language) model for the electronic circuit designs. At 404, the method or system may associate the one or more characteristics with one or more representations of the electronic design in one or more corresponding abstraction levels. The one or more representations may include, for example, a floorplan, a full or partial placement layout, a fully or partially routed layout, or an IBIS model suitable for IBIS simulations of the electronic design in some embodiments.

At 406, the method or system may determine the thermal effects or responses of the one or more circuit components in the electronic design using the one or more characteristics identified, determined, or estimated at 402. In some of these embodiments, the method or system may use the one or more characteristics such as the current information and/or power dissipation in the thermal simulation or analysis to determine the thermal responses or effects. For example, the method or system may use the pin currents or the interconnect segment electric currents to model the Joule heating effects of interconnects or interconnect segments. In some embodiments, the method or system may further segment an interconnect into multiple interconnect segments (e.g., n segments, where n is a positive integer greater than one). This interconnect may thus be modeled as "n" different heat sources distributed along the interconnect path, and each of these "n" heat sources generates $I^2R/n$ as the amount of Joule heating released or dissipated by the interconnect segment for the thermal simulation or analysis.

At 408, the method or system may perform thermal simulation or analysis using at least the thermal effects or responses determined at 406. For example, the method or system may use the power dissipation of a device as a heat generation source for a device and the Joule heating effects as another heat generation source for an interconnect or a segment thereof and perform the thermal simulation or thermal analysis using an IBIS simulator. In some other embodiments, the method or system may use other simulation techniques other than using an IBIS simulator to perform thermal simulation or analysis. For example, the method or system may use a brute force approach to simulate a transistor model of the electronic design or various other die-level, IC-package level, or PCB-level thermal models.

Figure 5:
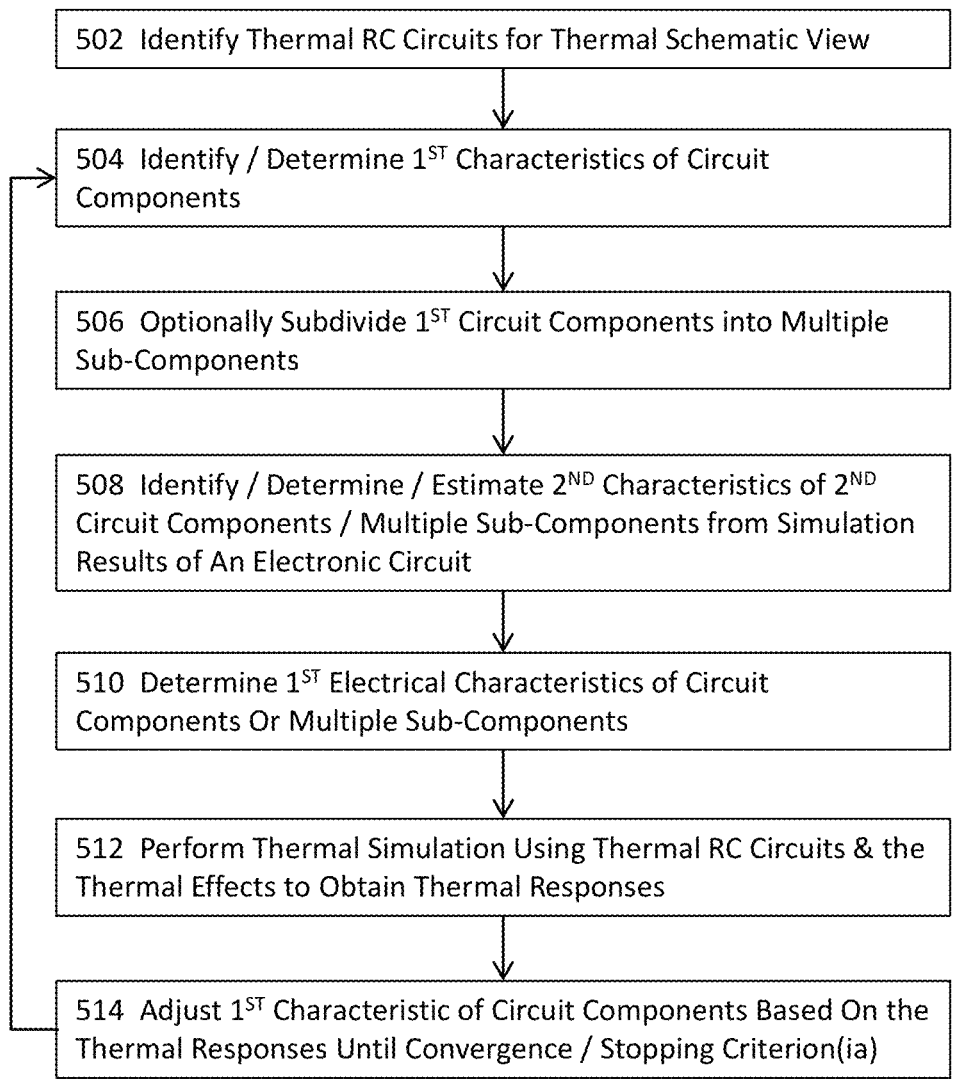
FIG. 5 illustrates a high level block diagram for a process or module for performing schematic driven thermal analyses accounting for device heat dissipation and interconnect Joule heating for electronic circuit designs in some embodiments.

FIG. 5 illustrates a more detailed block diagram of a process or module for performing schematic driven thermal analyses accounting for device heat dissipation and interconnect Joule heating for electronic circuit designs in some embodiments. In these embodiments illustrated in FIG. 5, the method or system may identify or extract a thermal RC circuit network for a thermal schematic view of an electronic design. In some of these illustrated embodiments, the thermal schematic view may be associated, annotated, or stitched with electric information including, for example, power dissipation of one or more devices, electric currents (e.g., average currents, root-mean square (RMS) or quadratic mean currents, average currents, transient current waveforms, etc.), various electric parasitics (e.g., electrical resistances, capacitances, inductances, etc.) of one or more circuit design components, physical characteristics of one or more circuit design components (e.g., the length, width, or profile of a circuit component, the resistivity of the material of a circuit component, or the temperature of a circuit component, etc.), or any other suitable information.

At 502, the thermal RC circuits may be identified for a thermal schematic view of an electronic design. The method or system may identify or determine one or more first characteristics of one or more circuit components at 504. The one or more first characteristics may include, for example, the electrical resistance of an interconnect in some embodiments. In some embodiments described in this application, the method or system may identify a piece of information or data if that piece of information or data already exists. On the other hand, the method or system may determine the piece of information or data if that piece of information or data does not exist at the time the method or system is to identify the piece of information or data. In these latter embodiments, the method or system may determine such piece of information or data by performing various processes or acts (e.g., analysis, computation, etc.)

The method or system may also optionally subdivide at least one of the one or more first circuit components into the corresponding multiple sub-components at 506. For example, the method or system may sub-divide an interconnect or a segment thereof into multiple, smaller sub-segments at 506. In these embodiments where a circuit component is sub-divided into multiple sub-components, each of these multiple sub-components may be individually modeled in the thermal schematic view. For example, an interconnect segment may be modeled as a single Joule heating source by using, for example, the length, the bulk electrical resistivity, and the profile or width to model the interconnect segment as a resistor in a thermal schematic view of a circuit design in some embodiments. In some other embodiments, the interconnect segment may be sub-divided into multiple, smaller segments.

Each of these multiple, smaller segments may be individually modeled as a resistor with, for example, the length and the width or profile of the interconnect and the bulk resistivity of the interconnect material in the thermal schematic view. At 508, the method or system may further identify, determine, or estimate one or more second characteristics of one or more corresponding second circuit components or of the multiple, sub-components from simulation results of the electronic circuit design. In some of these embodiments, the one or more second characteristics may include electric currents flowing into or out of one or more pins, pads, or terminals, or power dissipation of the one or more second circuit components based on the electric current information, etc. The simulation results may include the results of one or more electrical simulations on the electronic design at the schematic or functional level in some embodiments. Based at least in part upon these one or more second characteristics, the method or system may determine one or more first electrical characteristics of the one or more circuit components or the multiple sub-components, if available, at 510. The one or more first electrical characteristics may include, for example, electric currents flowing from various pins, terminals, or pads through one or more interconnect segments in some embodiments.

At 512, the method or system may perform one or more thermal analyses or simulations by using the one or more thermal RC circuits of the thermal schematic view to obtain the thermal responses for the electronic circuit design. In some embodiments, the method or system may use a SPICE or a SPICE-like simulator for the one or more thermal analyses or simulations. In addition or in the alternative, the method or system may use the one or more first characteristics and/or the one or more second characteristics in the thermal analyses or simulations. For example, the method or system may use the a parameterized interconnect model to model the Joule heating effects of interconnect segments.

The parameterized interconnect model may include one or more parameters that receive one or more corresponding values of, for example, the length information, the width, profile, or cross-sectional are, the bulk resistivity of the material, electric current, and/or the temperature ("T") information to model an interconnect segment. The parameterized model may then model the Joule heating effects of various interconnect segments by using the respective values of these interconnect segments by using the Joule's first law. At 514, the method or system may adjust at least one of the one or more first characteristics based at least in part upon the thermal responses of the electronic design. The method or system may then return to 404B to identify the updated one or more first characteristics and repeat the acts as describe above until a convergence or stopping criterion is reached. For example, the method may determine from the thermal response that an interconnect segment may generate an excessive amount of heat from Joule's heating at 512.

The method or system may attempt to reduce the excessive amount of heat generation or dissipation due by reducing the electrical resistance of the interconnect in the thermal schematic view at 514. This reduced length translates to the change in the length of the interconnect. The method or system may thus adjust the electronic design accordingly by, for example, changing the placement of the source component or destination component of the interconnect to change the Manhattan distance for the interconnect (where routing information is unavailable), changing the route of the interconnect (where routing information is available), or changing the length information associated with the thermal schematic view or the electrical schematic view of the electronic design.

Figure 6:
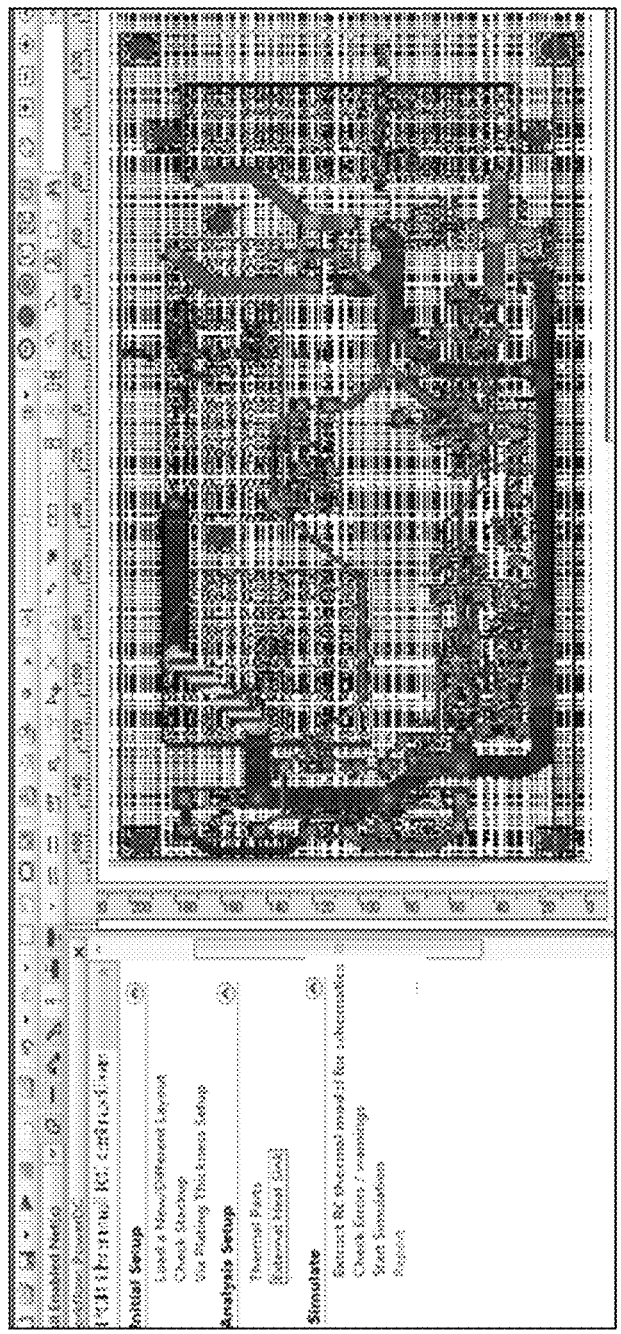
FIG. 6 illustrates a portion of a user interface for the schematic driven concurrent EMC, thermal, and electrical simulations techniques described above in some embodiments.

FIG. 6 illustrates a portion of a user interface for the schematic driven concurrent EMC, thermal, and electrical simulations techniques described above in some embodiments. The thermal RC circuits may be extracted and imported into or associate with the electrical model to form a thermal schematic view that has exactly the same circuit nodes as the electrical schematic. In this manner, the thermal schematic view may also be simulated with a schematic level simulator such as a SPICE or SPICE-like simulator, without having to use the conventional time-stepping or discretization-based numerical techniques for transient and steady-state thermal analyses or simulations. It shall be noted that various methods or system described herein may perform the EMC analyses, the thermal analyses or simulations, and the electrical simulations or analyses concurrently, although the concurrent performance of these three types of analyses or simulations does not preclude the possibility of running these analyses or simulations in a batch mode or sequentially.

Figure 7:
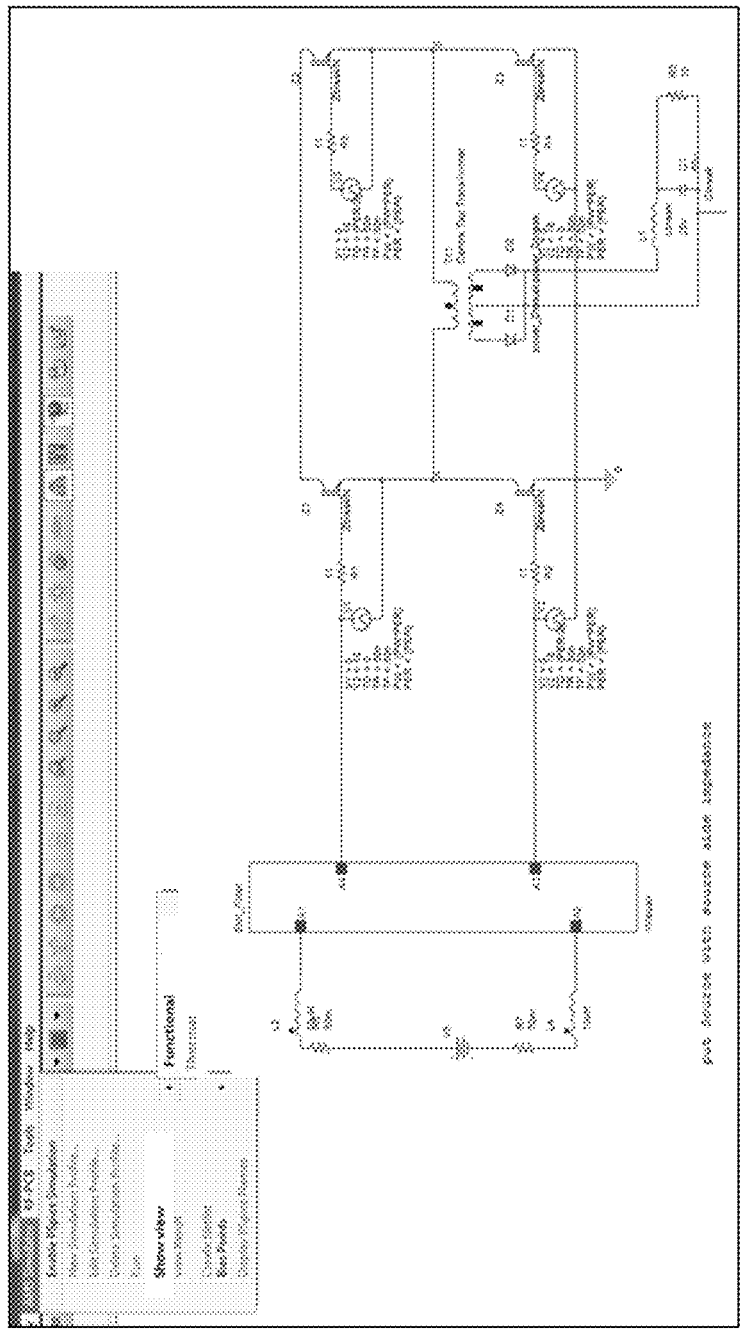
FIG. 7 shows a portion of a user interface illustrating a functional or electrical simulation view for a method or system for schematic driven, unified thermal and electromagnetic interference compliance analyses for electronic circuit designs in some embodiments.

FIG. 7 shows a portion of a user interface illustrating a functional or electrical simulation view for a method or system for schematic driven, unified thermal and electromagnetic interference compliance analyses for electronic circuit designs in some embodiments. As described above, the method or system may update the thermal schematic view for to reflect changes in the placement layout or routed layout. Similarly, the method or system may also update the placement layout or routed layout to reflect any changes in the thermal schematic view. For example, an electrical resistance value of an interconnect may be altered in a thermal schematic view based on some thermal analysis results to reduce the Joule heating effect of the interconnect.

Upon or shortly after the change in the electrical resistance, the method or system may change, for example, the source component and/or the destination component in the placement layout for the interconnect to reflect the reduced electrical resistance that corresponds to a shorter length and hence a shorter Manhattan distance between the source component and the destination component in the placement layout. If a routed layout for the portion including the interconnect is also available, the method or system may also invoke the router to change the routed design of the interconnect to reflect the reduced length from the reduced electrical resistance. In some embodiments where the electrical or thermal schematic view is also stitched with or associated with the interconnect length information, the method or system may also change the stitched or associated length information in the electrical or thermal schematic view.

Similar changes may also be propagated from the layout or electrical schematic to the thermal schematic view. That is, if the position or length of an interconnect is altered in a layout (either the actual length from a routed design or the Manhattan distance from a placement layout), the corresponding electrical resistance and/or thermal resistance (from thermal RC extraction) in the thermal schematic view may also be updated to reflect the change.

Figure 8:
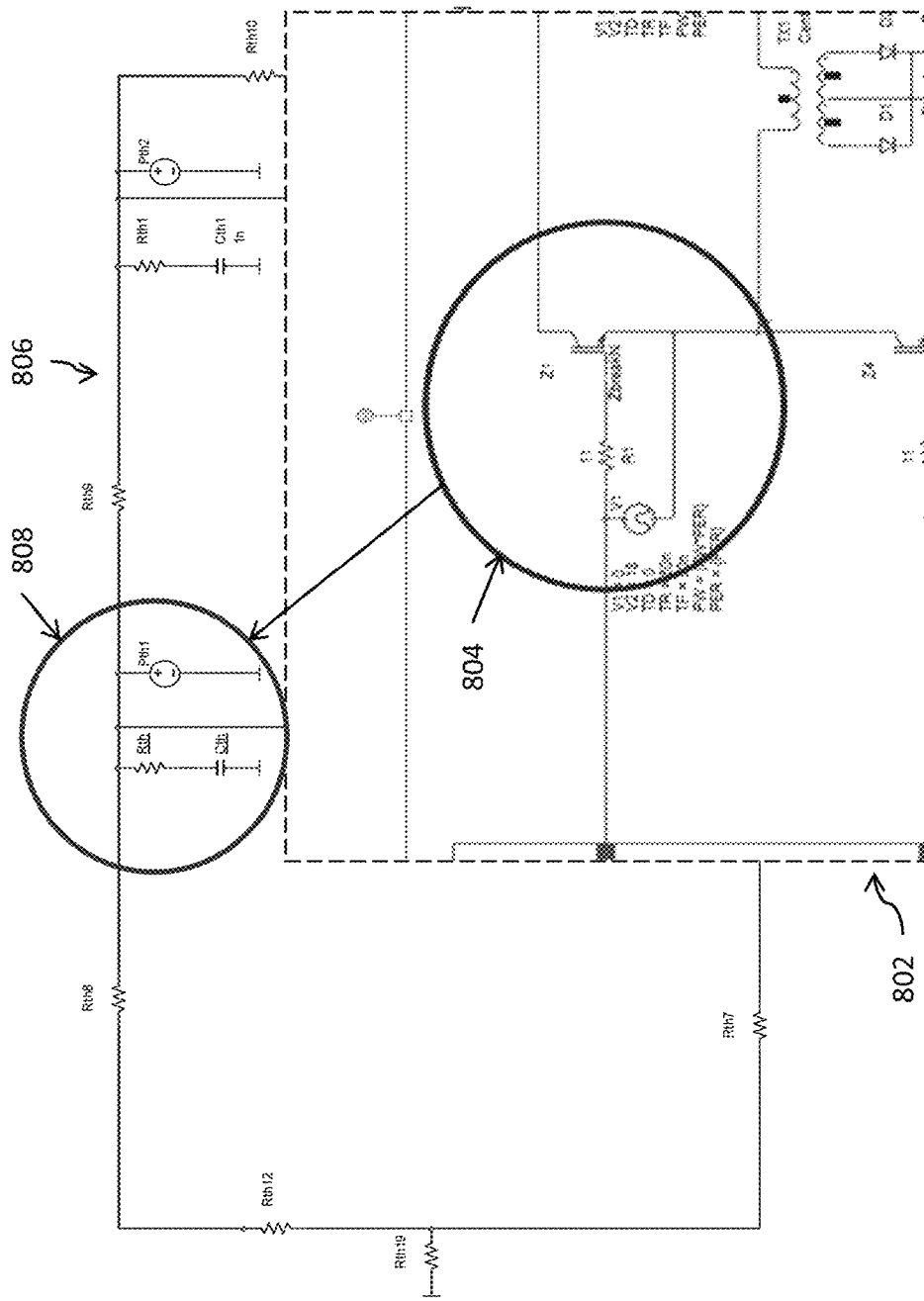
FIG. 8 shows a portion of a thermal schematic view and a portion of an electrical schematic view of an electron circuit design in some embodiments.

FIG. 8 shows a portion of a thermal schematic view and a portion of an electrical schematic view of an electronic circuit design in some embodiments. More specifically, a thermal schematic view 806 including the thermal schematic portion 808 may be constructed from the corresponding electrical schematic portion 804 in an electrical schematic view 802 using the thermal resistances ($R_{TH}$), thermal capacitances ($C_{TH}$), and the power or current sources ($P_{TH}$) via thermal RC circuit extraction as described above.

Figure 9:
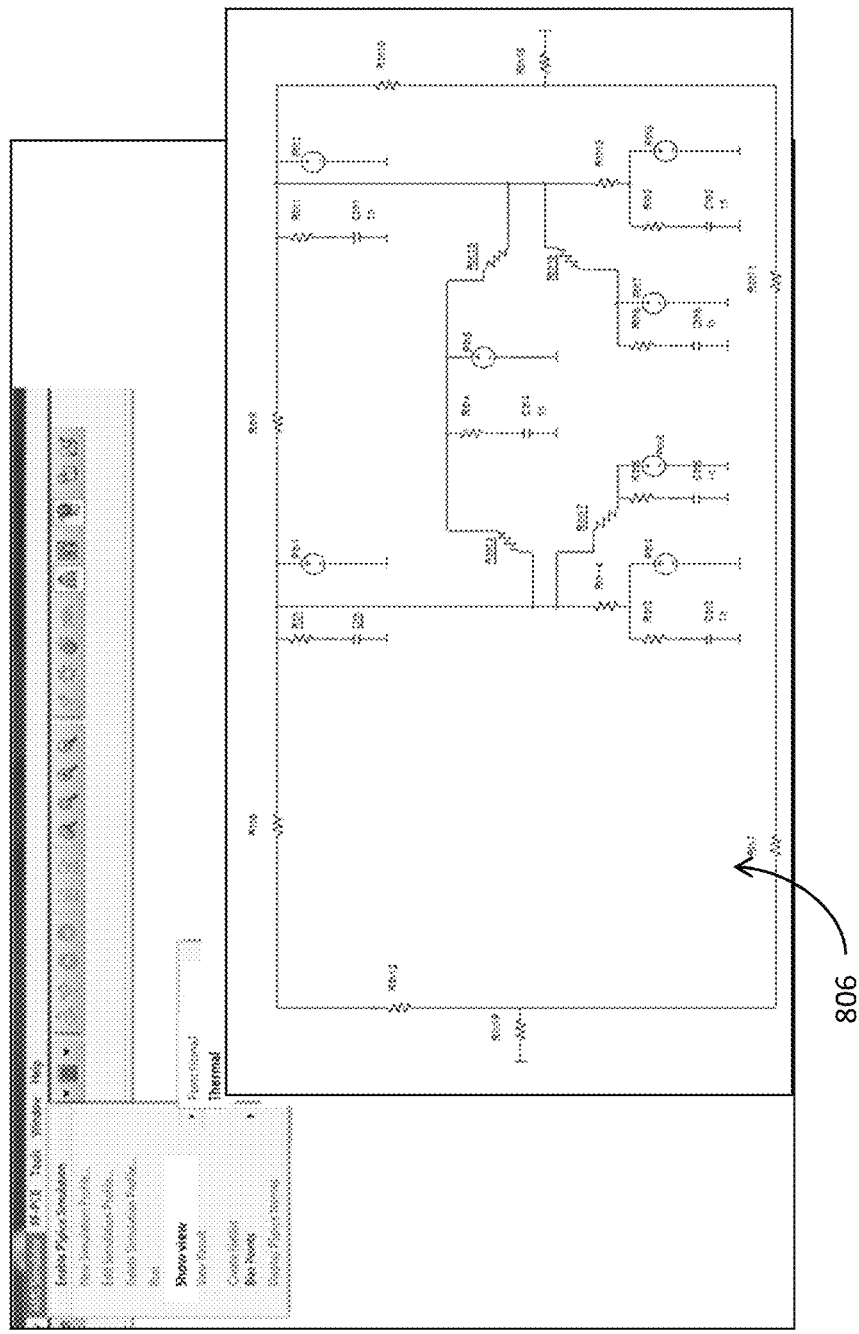
FIG. 9 illustrates a portion of a user interface for performing a thermal simulation or analysis for an electronic circuit in some embodiments.

FIG. 9 illustrates a portion of a user interface for performing a thermal simulation or analysis for an electronic circuit in some embodiments. More specifically, FIG. 9 illustrates a portion of the user interface for performing thermal simulation or analysis with a thermal schematic view 806 of FIG. 8 that may be determined from the corresponding electrical schematic view of the electronic circuit. The thermal schematic view of the electronic circuit includes the thermal resistances ($R_{TH}$), thermal capacitances ($C_{TH}$), and the power or current sources ($P_{TH}$) that are extracted from the electronic circuit design and imported into or overlaid onto the electrical schematic view having the same circuit nodes in substantially similar or identical manners as described above. The user interface also provides the options for the designer to use general purpose electronic circuit simulators include SPICE or SPICE-like simulation engines to perform thermal analyses or simulations. The user interface may also display the electrical schematic view and the thermal schematic view in a cascade, tiled, or split-window manner such that the designer may refer to both views in light of the EMC, thermal, and/or electrical simulation or analysis results.

Figure 10:
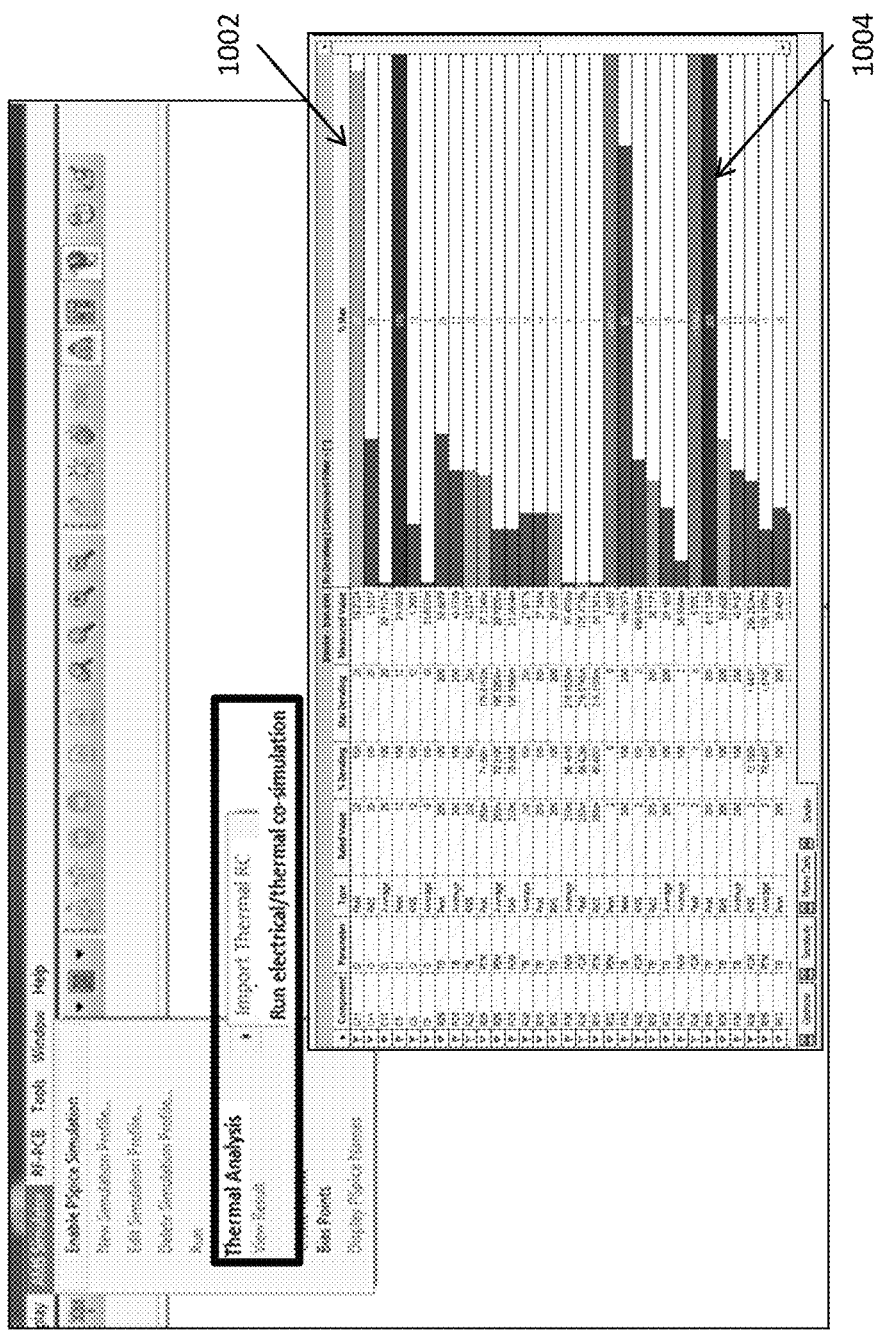
FIG. 10 illustrates tabulated electrical-thermal-EMC co-simulation results including graphical indications of criticality of components of an electronic design with respect to electromagnetic interference compliance in some embodiments.

FIG. 10 illustrates tabulated electrical-thermal-EMC co-simulation results including graphical indications of criticality of components of an electronic design with respect to electromagnetic interference compliance in some embodiments. In these illustrated embodiments, the co-simulation results may include the numerical values of the simulated results (e.g., the simulated peak, RMS, average currents of various components, the corresponding deratings of various components, etc.). The co-simulation results may also include graphical representations of these simulated results with respect to the corresponding deratings. In some embodiments, the simulated results may be identified with visual indicators for different categories of results.

For example, some textual or graphical information or data 1002 in the simulation results may be represented in a yellow color to indicate that the textual or graphical information or data is, for example, within a predetermined threshold percentage of the permissible level (e.g., 90% of the derating of the circuit component). Some textual or graphical information or data 1004 in the simulation results may be represented in a red color to indicate that the textual or graphical information or data exceeds a predetermined threshold permissible level (e.g., exceeding the derating of the circuit component). Moreover, the simulation results may also include or compute the time derivatives of the currents, voltages, or temperatures (e.g., dI/dt, dV/dt, or dT/dt where I stands for electric current, V stands for voltage, and T stands for temperature) to determine whether certain devices raise EMC issues, electrical issues, or thermal issues to identify certain devices as EMC, electrically, or thermally critical devices. In some embodiments, the simulation results may also use graphical and/or textual indicators to emphasize these critical devices in the user interface.

Figure 11:
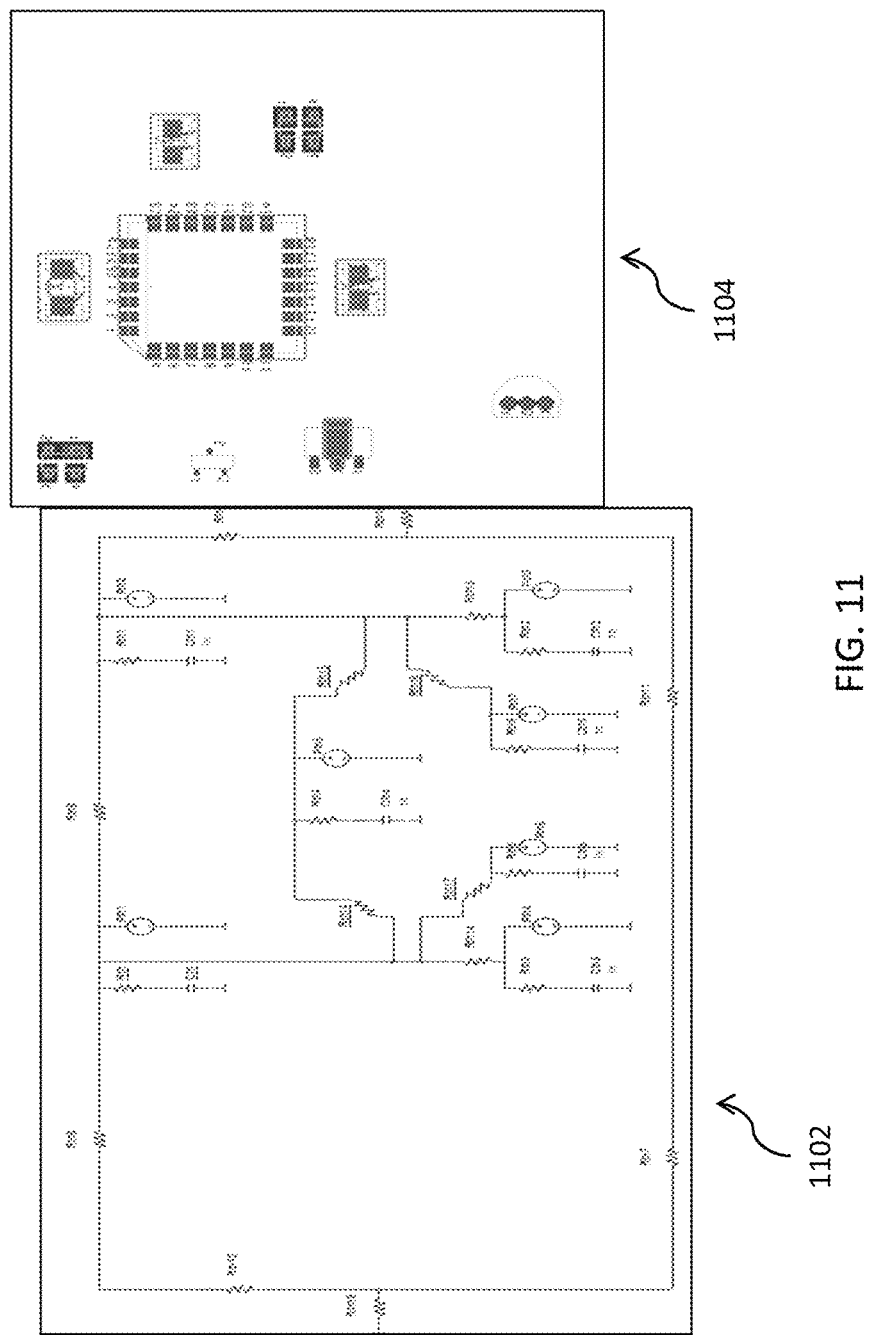
FIG. 11 illustrates a portion of a user interface including a thermal schematic view and the corresponding placement layout of an electronic circuit design or a portion thereof for cross-editing in some embodiments.

FIG. 11 illustrates a portion of a user interface including a thermal schematic view 1102 and the corresponding placement layout 1104 of an electronic circuit design or a portion thereof for cross-editing in some embodiments. The thermal schematic view 1102 and the corresponding placement layout 1104 may be presented in a single user interface or in two separate user interfaces of a two separate electronic design automation tools (e.g., a schematic editor and a placement tool). In addition, a design may initiate a change in one of the views (e.g., in the thermal schematic view 1102), and the method or system described herein may automatically update the other view with the corresponding change.

Figure 12:
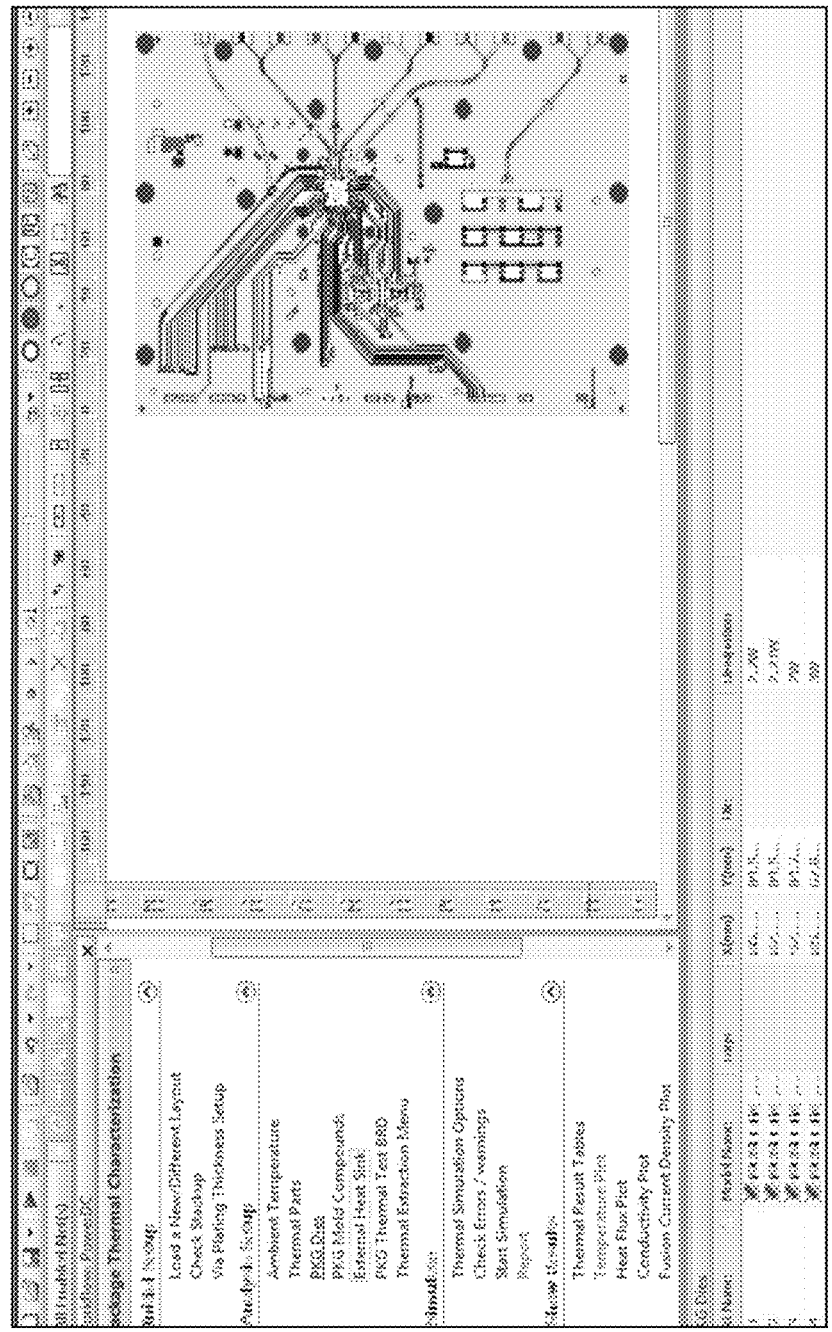
FIG. 12 illustrates a layout view or a portion thereof including analog, digital, mixed-signal components, and interconnects with associated or stitched schematic level electrical characteristics in some embodiments.

FIG. 12 illustrates a layout view or a portion thereof including analog, digital, mixed-signal components, and interconnects with associated or stitched schematic level electrical characteristics in some embodiments. In some embodiments, the method or system may pass electrical information obtained at the schematic level to the corresponding layout portion. The electrical information may be obtained from, for example, schematic or electrical simulations with a SPICE or SPICE-like simulator on an electrical schematic view of the layout and may include, for example, electric currents at pins, pads, or terminals and power dissipation of devices.

Figure 13:
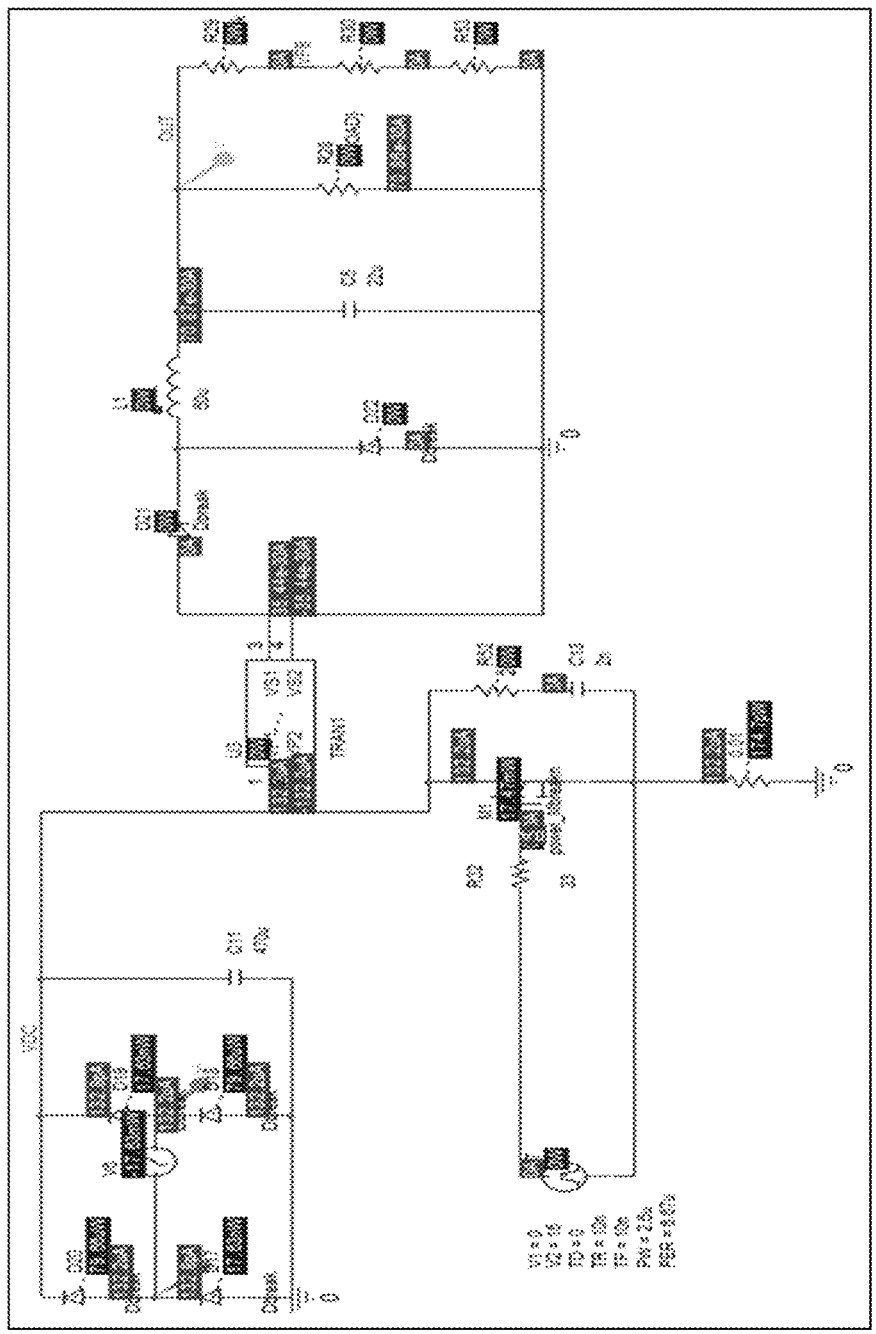
FIG. 13 illustrates an electric schematic view or a portion thereof including associated, stitched, or annotated electrical and thermal data from layout-based analyses in some embodiments.

FIG. 13 illustrates an electric schematic view or a portion thereof including associated, stitched, or annotated electrical and thermal data from layout-based analyses in some embodiments. In some embodiments, the method or system may annotate the schematic view with thermal responses or data from thermal analysis on a thermal schematic view. The electronic design to which various techniques or methodologies apply may include a test bench design including a printed circuit board (PCB) design and various components (e.g., interconnects and devices) at the test bench level, a PCB design including one or more IC (integrated circuit) packaging designs, interconnects, and circuit components at the PCB level, and an IC packaging design including a die, interconnects, and IC packaging.

System Architecture Overview

Figure 14:
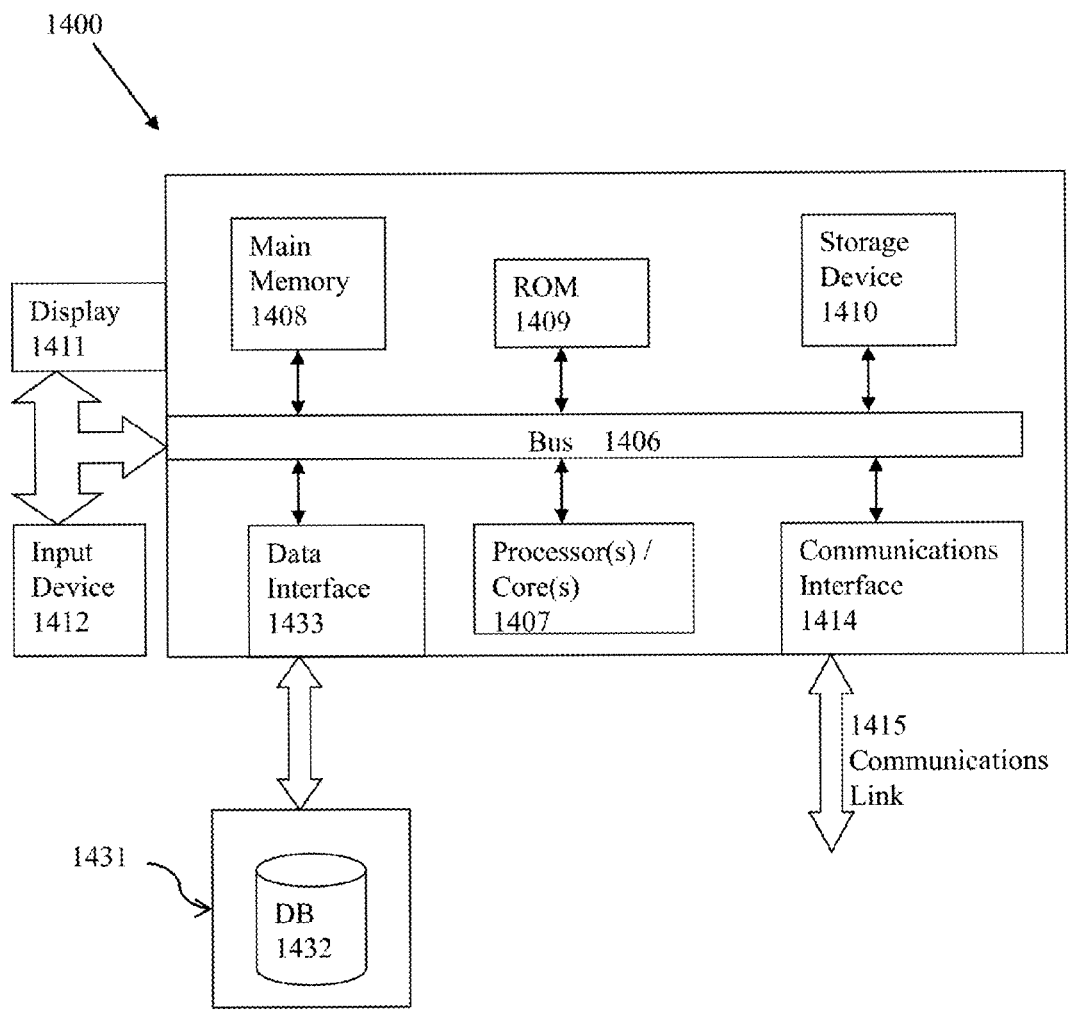
FIG. 14 illustrates a computerized system on which a method for implementing a physical design of an electronic circuit with automatic snapping can be implemented.

FIG. 14 illustrates a block diagram of an illustrative computing system 1400 suitable for implementing pulse-density modulation audio intellectual property block as described in the preceding paragraphs with reference to various figures. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment, computer system 1400 performs specific operations by one or more processor or processor cores 1407 executing one or more sequences of one or more instructions contained in system memory 1408. Such instructions may be read into system memory 1408 from another computer readable/usable storage medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1407, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In an embodiment, the computer system 1400 operates in conjunction with a data storage system 1431, e.g., a data storage system 1431 that includes a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals that include data streams representing various types of signal information, e.g., instructions, messages and data. In embodiments of the invention, the functions of the data interface 1433 may be performed by the communication interface 1414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for schematic driven, unified thermal and electromagnetic interference compliance analyses for electronic circuit designs, comprising executing a sequence of instructions by using at least one processor or processor core executing one or more threads of the computing system to perform a process, the process computing:
   identifying or generating an electrical representation in a schematic abstraction level of an electronic design;
   generating a thermal schematic representation in the schematic abstraction level of the electronic design by associating thermal RC circuits comprising at least one thermal capacitive element for the electronic design with the electrical representation;
   performing, at a plurality of analysis modules stored at least partially in memory of one or more computing systems, a thermal analysis in an electrical context of one or more electrical analyses and the one or more electrical analyses comprising an electromagnetic interference compliance (EMC) analysis in a thermal context of the thermal analysis respectively with the thermal schematic representation and the electrical representation of the electronic design; and
   improving thermal behavior of the electronic design at least by reducing heat generation of the electronic design based in part or in whole upon one or more implementation constraints that are correlated with one or more modified thermal characteristics obtained from results of the thermal analysis.

2. The computer implemented method of claim 1, the process further comprising:
   extracting the thermal schematic RC circuits for the electronic design, wherein
      the electrical representation comprises an electrical schematic of the electronic design, and
      the thermal schematic representation comprises a thermal schematic including same nodes as the electrical schematic.

3. The computer implemented method of claim 1, the act of generating the thermal schematic representation further comprising:
   identifying the thermal RC circuits of the electronic design;
   identifying corresponding electrical circuit components that correspond to the thermal RC circuits in the electrical representation of the electronic design; and
   forming the thermal schematic representation by at least importing the thermal RC circuits into the electrical representation according to the corresponding electrical circuit components in the electrical representation.

4. The computer implemented method of claim 1, the process further comprising at least one of:
   associating one or more electrical characteristics or one or more physical characteristics with the electrical representation or the thermal schematic representation of the electronic design;
   stitching the one or more electrical characteristics or the one or more physical characteristics into the electrical representation or the schematic thermal representation of the electronic design;
   annotating one or more electrical characteristics or one or more physical characteristics onto the electrical representation or the thermal schematic representation of the electronic design; and
   performing the thermal analysis using at least one general purpose circuit simulator with the one or more electrical characteristics or the one or more physical characteristics.

5. The computer implemented method of claim 1, further comprising:
   improving the electronic design at least by:
      modifying one or more first characteristics of the thermal schematic representation of the electronic design based at least in part upon results of the at least two analyses; and
      modifying one or more second characteristics of the electrical representation or a layout portion of the electronic design according to the one or more first characteristics that are modified.

6. The computer implemented method of claim 5, wherein the one or more first characteristics include at least a size of a circuit component design, and the one or more second characteristics include at least a thermal resistance of the circuit component design.

7. The computer implemented method of claim 1, the process further comprising at least one of:
   determining steady-state thermal responses of the electronic design by using the results; and
   determining transient thermal responses of the electronic design by using the results.

8. The computer implemented method of claim 1, the process further comprising:
   forwarding thermal analysis results to the electrical analysis or the EMC analysis; and
   performing the electrical analysis or the EMC analysis with at least the thermal analysis results to obtain electrical analysis results or EMC analysis results.

9. The computer implemented method of claim 8, the process further comprising:
   forwarding the electrical analysis results or the EMC analysis results to the thermal analysis; and
   performing the thermal analysis with at least the electrical analysis results or the EMC analysis results to obtain updated thermal analysis results until a criterion is satisfied.

10. The computer implemented method of claim 1, the process further comprising:
    performing an electrical simulation on the electrical representation of the electronic design to obtain one or more electrical characteristics of the electronic design, wherein
       the one or more electrical characteristics include one or more pin currents and power dissipation of one or more devices.

11. The computer implemented method of claim 1, the process further comprising:
    modifying the one or more second characteristics of the electrical representation or the layout portion of the electronic design based at least in part upon the results; and
    automatically modifying the one or more first characteristics of the thermal schematic representation of the electronic design according to the one or more second characteristics that are modified.

12. The computer implemented method of claim 1, wherein the electronic design is at a pre-layout stage having no placement or routing design information.

13. The computer implemented method of claim 1, the process further comprising at least one of:
- identifying electrical characteristics from the electrical representation of the electronic design and forwarding the electrical characteristics to the thermal schematic representation of the electronic design for the thermal analysis;
- sub-dividing a circuit component design into multiple sub-component designs and performing a cross domain analysis with the multiple sub-component designs; and
- identifying one or more EMC critical components in the electronic design based at least in part upon the results.

14. A system for schematic driven, unified thermal and electromagnetic interference compliance analyses for electronic circuit designs, comprising:
- non-transitory computer readable storage memory storing thereupon program code, the program code comprising a sequence of instructions;
- a processor or a processor core executing one or more threads in a computing system to execute the sequence of instructions of the program code to:
  - identify or generate an electrical representation in a schematic abstraction level of an electronic design;
  - generate a thermal schematic representation in the schematic abstraction level of the electronic design by associating thermal RC circuits comprising at least one thermal capacitive element for the electronic design with the electrical representation;
  - perform, at a plurality of analysis modules stored at least partially in memory of one or more computing systems, a thermal analysis in an electrical context of one or more electrical analyses and the one or more electrical analyses comprising an electromagnetic interference compliance (EMC) analysis or an electrical analysis in a thermal context of the thermal analysis respectively with the thermal schematic representation and the electrical representation of the electronic design; and
  - improving thermal behavior of the electronic design at least by reducing heat generation of the electronic design based in part or in whole upon one or more implementation constraints that are correlated with one or more modified thermal characteristics obtained from results of the thermal analysis.

15. The system of claim 14, wherein the processor or processor core further executes the sequence of instructions of the program code to:
- extract the thermal RC circuits for the electronic design, wherein
  - the electrical representation comprises an electrical schematic of the electronic design, and
  - the thermal schematic representation comprises a thermal schematic including same nodes as the electrical schematic.

16. The system of claim 14, wherein the processor or processor core further executes the sequence of instructions of the program code to:
- identify the thermal RC circuits of the electronic design;
- identify corresponding electrical circuit components that correspond to the thermal RC circuits in the electrical representation of the electronic design; and
- form the thermal schematic representation by at least importing the thermal RC circuits into the electrical representation according to the corresponding electrical circuit components in the electrical representation, wherein
  - the electrical representation comprises an electrical schematic of the electronic design, and
  - the thermal schematic representation comprises a thermal schematic including same nodes as the electrical schematic.

17. The system of claim 14, wherein the processor or processor core further executes the sequence of instructions of the program code to:
- identify electrical characteristics from the electrical representation of the electronic design and forwarding the electrical characteristics to the thermal schematic representation of the electronic design for the thermal analysis;
- sub-divide a circuit component design into multiple sub-component designs and performing the at least two analyses with the multiple sub-component designs; and
- identify one or more EMC critical components in the electronic design based at least in part upon the results.

18. An article of manufacture comprising a non-transitory computer accessible storage medium having stored thereupon a sequence of instructions which, when executed by at least one customizable processor executing one or more threads, causes the at least one customizable processor to perform a set of acts for schematic driven, unified thermal and electromagnetic interference compliance analyses for electronic circuit designs, the set of acts comprising:
- identifying or generating an electrical representation in a schematic abstraction level of an electronic design;
- generating a thermal schematic representation in the schematic abstraction level of the electronic design by associating thermal RC circuits comprising at least one thermal capacitive element for the electronic design with the electrical representation;
- performing, at a plurality of analysis modules stored at least partially in memory of one or more computing systems, a thermal analysis in an electrical context of one or more electrical analyses and the one or more electrical analyses comprising an electromagnetic interference compliance (EMC) analysis in a thermal context of the thermal analysis respectively with the thermal schematic representation and the electrical representation of the electronic design;
- improving thermal behavior of the electronic design at least by reducing heat generation of the electronic design based in part or in whole upon one or more implementation constraints that are correlated with one or more modified thermal characteristics obtained from results of the thermal analysis.

19. The article of manufacture of claim 18, the set of acts further comprising:
- extracting the thermal RC circuits for the electronic design, wherein
  - the electrical representation comprises an electrical schematic of the electronic design, and
  - the thermal schematic representation comprises a thermal schematic including same nodes as the electrical schematic.

20. The article of manufacture of claim 18, the set of acts further comprising:
- identifying the thermal RC circuits of the electronic design;
- identifying corresponding electrical circuit components that correspond to the thermal RC circuits in the electrical of the electronic design; and
- forming the thermal schematic representation by at least importing the thermal RC circuits into the electrical representation according to the corresponding electrical circuit components in the electrical representation, wherein the electrical representation comprises an electrical schematic of the electronic design, and the thermal schematic representation comprises a thermal schematic including same nodes as the electrical schematic.

\* \* \* \* \*